US012099580B2

(12) United States Patent
Takayama et al.

(10) Patent No.: US 12,099,580 B2
(45) Date of Patent: Sep. 24, 2024

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventors: Kei Takayama, Kanagawa (JP); Masakazu Matsugu, Kanagawa (JP); Atsushi Nogami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 439 days.

(21) Appl. No.: 17/492,708

(22) Filed: Oct. 4, 2021

(65) Prior Publication Data

US 2022/0019848 A1 Jan. 20, 2022

Related U.S. Application Data

(63) Continuation of application No. PCT/JP2020/007317, filed on Feb. 25, 2020.

(30) Foreign Application Priority Data

Apr. 9, 2019 (JP) ................................ 2019-074269

(51) Int. Cl.
*G06F 18/40* (2023.01)
*G06F 18/22* (2023.01)

(52) U.S. Cl.
CPC .............. *G06F 18/40* (2023.01); *G06F 18/22* (2023.01)

(58) Field of Classification Search
CPC .. G06V 10/762; G06V 10/7788; G06F 16/54; G06F 16/53; G06F 18/22; G06F 18/40; G06N 20/00
See application file for complete search history.

(56) References Cited

U.S. PATENT DOCUMENTS 9,147,130 B2 9/2015 Saruta et al.
9,697,441 B2 7/2017 Mitarai et al.
(Continued)

FOREIGN PATENT DOCUMENTS

JP 2013117409 A * 6/2013
JP 5368873 B2 12/2013
JP 2015-198300 A 11/2015

OTHER PUBLICATIONS

Marks, J., et al. "Design Galleries: A General Approach to Setting Parameters for Computer Graphics and Animation." Proc. SIGGRAPH97. ACM SIGGRAPH, 1997. (Year: 1997).*
(Continued)

*Primary Examiner* — Vu Le
*Assistant Examiner* — Tracy Mangialaschi
(74) *Attorney, Agent, or Firm* — Carter, DeLuca & Farrell LLP

(57) ABSTRACT

An information processing apparatus comprises an image processing unit configured to acquire a plurality of images representing results of executing predetermined image processing for target data using a plurality of candidate values of a parameter associated with the predetermined image processing; a selection unit configured to select a plurality of representative images from the plurality of images; a display control unit configured to display the plurality of selected representative images on a display unit; an operation unit configured to accept an operation input to the plurality of displayed representative images; and a statistical processing unit configured to decide at least one value from the plurality of candidate values based on a result of statistical processing of information obtained by the accepted operation.

19 Claims, 13 Drawing Sheets

(56) References Cited

U.S. PATENT DOCUMENTS

| | | |
|---|---|---|
| 9,792,689 B2 | 10/2017 | Shiozaki et al. |
| 10,380,759 B2 | 8/2019 | Shiozaki et al. |
| 10,459,968 B2 | 10/2019 | Kuroki et al. |
| 2013/0051687 A1 | 2/2013 | Kuroki et al. |
| 2018/0156736 A1* | 6/2018 | Kondo .................. G06T 7/0002 |
| 2019/0304284 A1 | 10/2019 | Takeuchi et al. |
| 2021/0281748 A1 | 9/2021 | Nogami et al. |

OTHER PUBLICATIONS

Koyama, Yuki. Computational Design Driven by Visual Aesthetic Preference. Doctoral dissertation, University of Tokyo, 2017. (Year : 2017).*

International Search Report issued by the Japan Patent Office on May 19, 2020 in corresponding International Application No. PCT/JP2020/007317, with English translation.

Marks, J. et al. "Design Galleries: A General Approach to Setting Parameters for Computer Graphics and Animation" SIGGRAPH' 97 Proceedings of the 24th annual conference on Computer graphics and interactive techniques, Association for Computing Machinery (Oct. 1997) pp. 389-400.

* cited by examiner

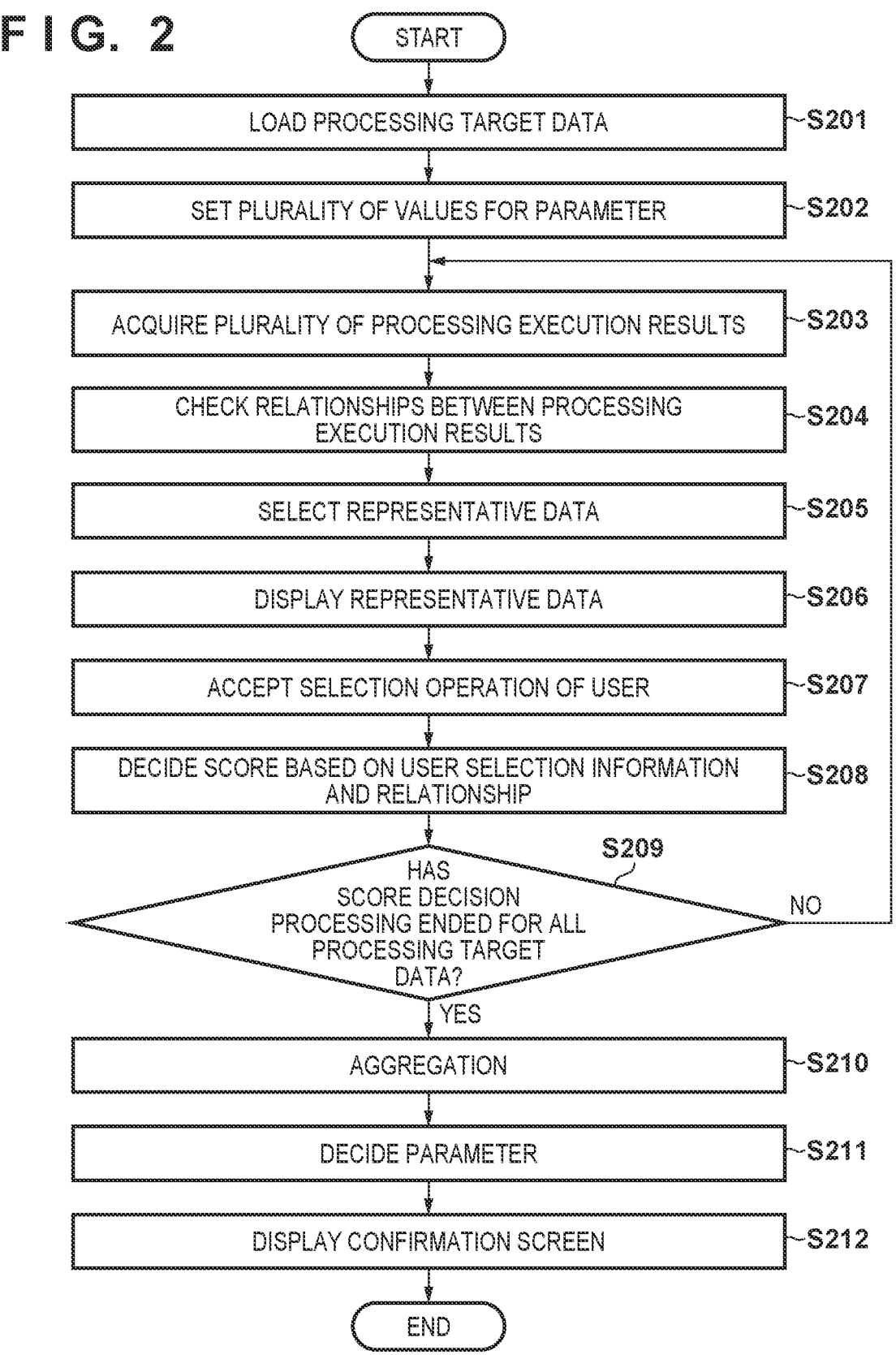

FIG. 4A

|    | α1  | α2  | α3  | α4  | α5  |
|----|-----|-----|-----|-----|-----|
| α1 | 1   | 0.8 | 0.7 | 0.6 | 0.5 |
| α2 | 0.8 | 1   | 0.8 | 0.8 | 0.6 |
| α3 | 0.7 | 0.8 | 1   | 0.6 | 0.6 |
| α4 | 0.6 | 0.8 | 0.6 | 1   | 0.7 |
| α5 | 0.5 | 0.6 | 0.6 | 0.7 | 1   |

FIG. 4B

| PARAMETER α | α1  | α2  | α3  | α4  | α5  |
|-------------|-----|-----|-----|-----|-----|
| image1      | 0.5 | 0.6 | 0.6 | 0.7 | 1   |
| image2      | 0   | 0.6 | 0.8 | 1   | 0.8 |
| AGGREGATION RESULT | 7.8 | 12.1 | 14.9 | 28.5 | 15.2 |

FIG. 4C

| PARAMETER α | α1 | α2 | α3 | α4 | α5 |
|-------------|----|----|----|----|----|
| image1      | g1 | g1 | g1 | g2 | g2 |

FIG. 4D

| PARAMETER α | α1 | α2 | α3 | α4 | α5 |
|-------------|----|----|----|----|----|
| image1      | 0  | 0  | 0  | 1  | 1  |
| image2      | 0  | 0  | 1  | 1  | 0  |
| AGGREGATION RESULT | 15 | 19 | 26 | 37 | 22 |

FIG. 7A

| PARAMETER α | α1 | α2 | α3 | α4 | α5 |
|---|---|---|---|---|---|
| image1 | g1 | g1 | g2 | g2 | g3 |

FIG. 7B

| PAIR OF PARAMETERS OF REPRESENTATIVE DATA | α1 | α3 | α5 |
|---|---|---|---|
| α1,α3 | 1 | 0 | NULL |
| α1,α5 | 1 | NULL | 0 |
| α3,α5 | NULL | 1 | 0 |

FIG. 7C

| PARAMETER α | α1 | α3 | α5 |
|---|---|---|---|
| AGGREGATION RESULT | 2 | 1 | 0 |

FIG. 7D

| PARAMETER α | α1 | α2 | α3 | α4 | α5 |
|---|---|---|---|---|---|
| image1 | 1 | 1 | 0.5 | 0.5 | 0 |

F I G. 10A

| PARAMETER α | α1 | α2 | α3 | α4 | α5 |
|---|---|---|---|---|---|
| image1 | g1 | g1 | g1 | g2 | g2 |

F I G. 10B

| USER | α1 | α5 |
|---|---|---|
| USER 1 | 1 | 0 |
| USER 2 | 1 | 0 |
| USER 3 | 0 | 1 |

F I G. 10C

| PARAMETER α | α1 | α5 |
|---|---|---|
| image1 | 2 | 0.5 |

F I G. 10D

| PARAMETER α | α1 | α2 | α3 | α4 | α5 |
|---|---|---|---|---|---|
| image1 | 2 | 2 | 0.5 | 0.5 | 0.5 |

| PROCESSING TARGET DATA | α1 | α2 | α3 | α4 | α5 |
|---|---|---|---|---|---|
| image1 | g1 | g1 | NULL | g2 | g2 |

| PROCESSING TARGET DATA | DISTANCE |
|---|---|
| image1 | 200 |

INFORMATION PROCESSING APPARATUS, CONTROL METHOD FOR INFORMATION PROCESSING APPARATUS, AND STORAGE MEDIUM

CROSS-REFERENCE TO RELATED APPLICATIONS

This application is a Continuation of International Patent Application No. PCT/JP2020/007317, filed Feb. 25, 2020, which claims the benefit of Japanese Patent Application No. 2019-074269, filed Apr. 9, 2019, both of which are hereby incorporated by reference herein in their entirety.

BACKGROUND OF THE INVENTION

Field of the Invention

The present invention relates to an information processing apparatus, a control method for the information processing apparatus, and a storage medium and, more particularly, to a technique for appropriately deciding a parameter in image processing.

Background Art

It is important to appropriately decide a processing parameter in image processing. When selecting a best processing result, if ideal data or correct answer data can be prepared, a processing result closest to the ideal data is checked.

PTL 1 discloses a method of automatically deciding an optimum value of a parameter by checking the similarity with ideal data for each processing result.

PTL 2 discloses a method of deciding an appropriate value of a parameter by one attempt by preparing a plurality of images acquired using different parameters, statistically selecting representative data from the images to display them to a user, and then prompting the user to select better data.

CITATION LIST

Patent Literature

PTL 1: Japanese Patent No. 5368873
PTL 2: Japanese Patent Laid-Open No. 2015-198300

SUMMARY OF INVENTION

However, in the technique described in PTL 1, when it is impossible to perform theoretical prediction, for example, when ideal data cannot be prepared or when the correct answer of a processing result is not determined uniquely and objectively and is necessarily dependent on subjectivity, an appropriate value of a parameter cannot be determined. In the technique described in PTL 2, the user need only confirm only the representative data and thus the load of the user is small but the representative data do not always include a result obtained by using the appropriate setting value of the parameter.

As described above, in the conventional techniques, it is difficult to decide an appropriate value of a parameter while reducing the load of the user in a status in which there exist a plurality of data to be processed using the parameter.

The present invention has been made in consideration of the above problem, and provides a technique for deciding an appropriate value of a parameter while reducing the load of the user in a status in which there exist a plurality of data to be processed using the parameter.

SUMMARY OF THE INVENTION

To achieve the above object, according to the present invention, there is provided an information processing apparatus comprising: an image processing unit configured to acquire a plurality of images representing results of executing predetermined image processing for target data using a plurality of candidate values of a parameter associated with the predetermined image processing; a selection unit configured to select a plurality of representative images from the plurality of images; a display control unit configured to display the plurality of selected representative images on a display unit; an operation unit configured to accept an operation input to the plurality of displayed representative images; and a statistical processing unit configured to decide at least one value from the plurality of candidate values based on a result of statistical processing of information obtained by the accepted operation.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a flowchart for explaining the procedure of processing executed by the information processing apparatus according to the embodiment;

FIG. 4A is a table for explaining an example of processing of deciding an appropriate parameter:

FIG. 4B is a table for explaining the example of the processing of deciding an appropriate parameter:

FIG. 4C is a table for explaining an example of processing of deciding an appropriate parameter:

FIG. 4D is a table for explaining the example of the processing of deciding an appropriate parameter:

FIG. 7A is a table for explaining an example of processing of deciding an appropriate parameter;

FIG. 7B is a table for explaining the example of the processing of deciding an appropriate parameter;

FIG. 7C is a table for explaining the example of the processing of deciding an appropriate parameter;

FIG. 7D is a table for explaining the example of the processing of deciding an appropriate parameter;

FIG. 10A is a table for explaining an example of processing of deciding an appropriate parameter;

FIG. 10B is a table for explaining the example of the processing of deciding an appropriate parameter:

FIG. 10C is a table for explaining the example of the processing of deciding an appropriate parameter;

FIG. 10D is a table for explaining the example of the processing of deciding an appropriate parameter:

DESCRIPTION OF THE EMBODIMENTS

Figure 1A:
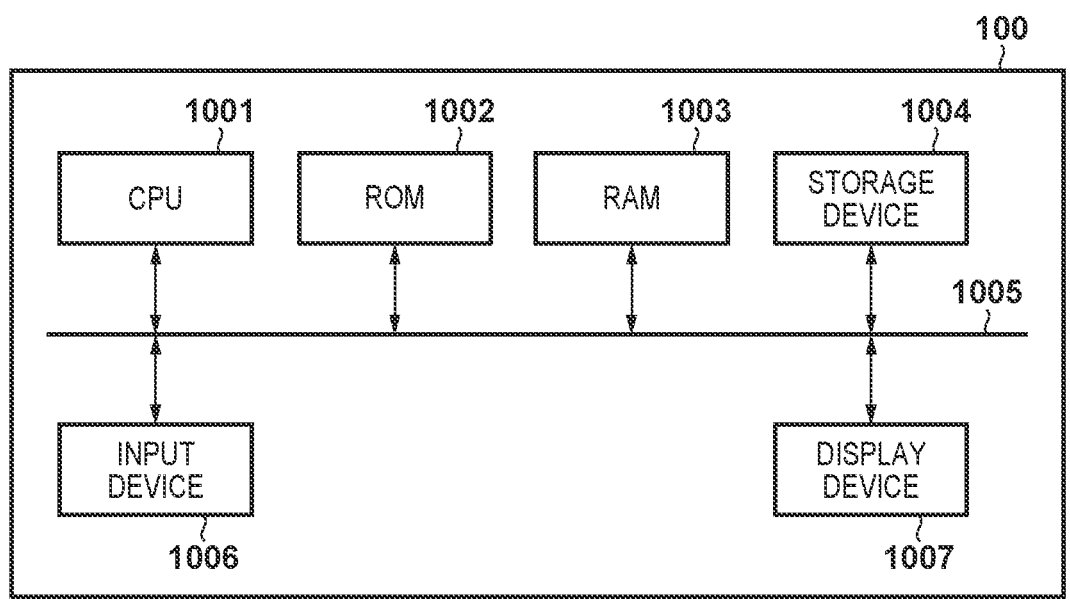
FIG. 1A is a block diagram showing an example of the hardware arrangement of an information processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In this embodiment, if ideal data or correct answer data cannot be prepared, an appropriate value to be set in a parameter is decided while reducing an amount of data to be observed by a person by assuming a status in which there exist a plurality of data to be processed using the parameter.

An information processing apparatus inputs a plurality of data to be processed and a plurality of candidate values with respect to a parameter to be used for the processing, and outputs an appropriate value (to also be referred to as an appropriate parameter hereinafter) of a parameter among the plurality of candidate values. Hereinafter, data to be processed using a parameter will be referred to as processing target data, data obtained by executing the processing using the parameter will be referred to as a processing execution result, and a value to be set as an appropriate parameter candidate in the parameter of interest will be referred to as a candidate value of the parameter.

The first embodiment assumes that the processing target data is an image obtained by image capturing, and the processing using the parameter is processing of applying, to the processing target data, a model generated by machine learning. Machine learning is a technique concerning a method of generating a model of automatically extracting specific information from data. Machine learning using an image is sometimes used as a method of creating a model for detecting the region or contour of a specific target object in the image. Examples of a parameter at the time of learning are a learning count and a learning ratio, and the first embodiment will explain an example of applying models with different learning counts to the processing target data.

<Overview>

An overview of an information processing apparatus according to this embodiment will be described. First, processing is executed for one given processing target data using a plurality of candidate values of a parameter, thereby acquiring a plurality of processing execution results. Next, a plurality of representative data are selected from the processing execution results, and presented to the user, and the user is prompted to subjectively select preferable representative data. Information concerning user selection will be referred to as user selection information hereinafter, and the representative data selected by the user will specifically be referred to as user selection data hereinafter. After the selection operation by the user, a score is given to the parameter corresponding to the user selection data. At this time, the relationships (for example, similarities) between the processing execution results and the user selection data are checked. If, as a result, among the processing execution results, there exists data similar to the user selection data, a score is also given to the parameter of the similar processing execution result. The reason why the score is given to the processing execution result other than the user selection data is that the appropriate processing execution result may not always be selected as representative data. After the above processing is repeatedly executed while changing the processing target data, the scores are aggregated to decide an appropriate value of the parameter.

As described above, in this embodiment, the score of each candidate value of the parameter is decided based on the relationship between the user selection information and each of the processing execution results.

The relationships between the processing execution results may be used to select representative data. For example, the similarity between the processing execution results is checked as the relationship, and a pair of the processing execution results having low similarity is specifically selected as representative data. If the relationships between the processing execution results are used to select representative data, the processing execution results that are largely different in appearance tend to be displayed, and it is thus easy for the user to make determination for a selection operation.

The first embodiment will describe a method of checking the similarities as the relationships between the processing execution results, and selecting representative data and deciding a score based on the similarities.

<Hardware Arrangement of Information Processing Apparatus>

FIG. 1A is a block diagram showing the hardware arrangement of an information processing apparatus 100. The information processing apparatus 100 includes a CPU 1001, a ROM 1002, a RAM 1003, a storage device 1004, a bus 1005, an input device 1006, and a display device 1007. The information processing apparatus 100 is formed by a general-purpose personal computer and the like.

The CPU 1001 controls various operations of functional blocks (to be described later) of the information processing apparatus 100. The control contents are instructed by a program on the ROM 1002 or the RAM 1003 (to be described later). The CPU 1001 can also operate a plurality of computer programs in parallel. The ROM 1002 stores data and computer programs that store the procedure of control by the CPU 1001. The RAM 1003 stores control programs to be processed by the CPU 1001, and also provides a work area for various data when the CPU 1001 executes various control operations. The functions of program codes stored in a recording medium such as the ROM 1002 or the RAM 1003 are read out and executed by the CPU 1001 and thus implemented. The type of the recording medium is not limited.

The storage device 1004 can store various data and the like. The storage device 1004 includes a recording medium such as a hard disk, a floppy disk, an optical disk, a magnetic disk, a magnetooptical disk, a magnetic tape, or a nonvolatile memory card, and a drive that drives the recording medium to record information. The stored computer programs and data are loaded into the RAM 1003, as needed, in accordance with an instruction from a keyboard or the like or an instruction of each of various kinds of computer programs.

The bus 1005 is a data bus or the like connected to each constituent element, and implements communication between the constituent elements and also implements information exchange at a high speed. The input device 1006 provides various kinds of input environments by the user. Although a keyboard, a mouse, and the like can be considered to provide various kinds of input operation environments, a touch panel, a stylus pen, or the like may also be used.

The display apparatus 1007 is formed by an LCD display or the like, and displays, to the user, the states of various input operations and calculation results according to these operations. Note that the above-described arrangement is merely an example, and the arrangement is not limited to the above-described arrangement.

<Functional Arrangement of Information Processing Apparatus>

Figure 1B:
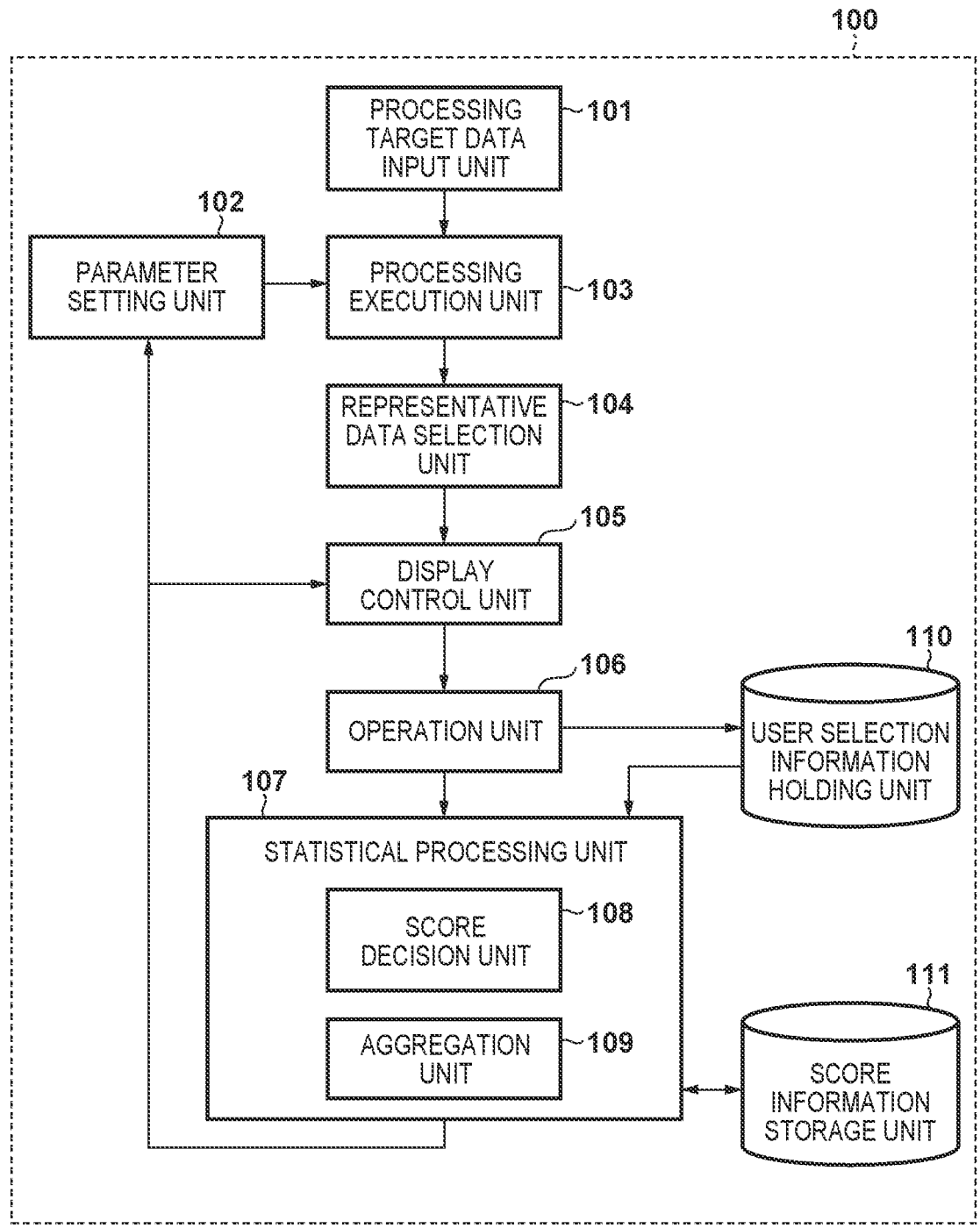
FIG. 1B is a block diagram showing an example of the functional arrangement of the information processing apparatus according to the embodiment.

FIG. 1B is a block diagram showing the functional arrangement of the information processing apparatus 100. The information processing apparatus 100 can be implemented when a computer formed by a CPU, a memory, a storage device, an input/output device, a bus, a display device, and the like executes software (program) acquired via a network or various kinds of information recording media. Note that for the computer, a general-purpose computer may be used or hardware optimally designed for software according to this embodiment may be used.

The information processing apparatus 100 includes a processing target data input unit 101, a parameter setting unit 102, a processing execution unit 103, a representative data selection unit 104, a display control unit 105, an operation unit 106, a statistical processing unit 107, a user selection information holding unit 110, and a score information storage unit 111.

The processing target data input unit 101 has a function of accepting processing target data.

The parameter setting unit 102 sets a plurality of candidate values for a parameter of interest to perform processing.

The processing execution unit 103 receives the processing target data and the candidate values of the parameter, and executes the processing for the processing target data using the different candidate values, thereby acquiring processing execution results.

The representative data selection unit 104 receives the plurality of processing execution results from the processing execution unit 103, and selects a plurality of representative data from the processing execution results.

The display control unit 105 receives the representative data from the representative data selection unit 104, and displays them on the display screen of the display device 1007 to prompt the user to perform a selection operation.

The operation unit 106 accepts a user operation of selecting data from the representative data. The operation unit 106 sends user selection information based on the selection operation of the user to the user selection information holding unit 110 and the statistical processing unit 107.

The user selection information holding unit 110 records the user selection information every time it is received. After repeatedly executing the processes of the representative data selection unit 104, the display control unit 105, and the operation unit 106 while changing the processing target data, the statistical processing unit 107 decides an appropriate value of the parameter by performing statistical processing using the user selection information and the processing execution results. The statistical processing unit 107 includes a score decision unit 108 and an aggregation unit 109.

The score decision unit 108 decides a score for each candidate value of the parameter based on the relationship between the user selection information and each of the plurality of processing execution results. The decided score is stored in a score table in the score information storage unit 111. The aggregation unit 109 aggregates the scores with reference to the score table in the score information storage unit 111, thereby deciding the appropriate value of the parameter.

Note that the arrangement shown in FIG. 1B includes, as storage devices, the user selection information holding unit 110 and the score information storage unit 11*l* but these are not structurally essential. Information in the user selection information holding unit 110 may be transferred directly from the operation unit 106 to the statistical processing unit 107. Information in the score information storage unit 111 may be transferred directly from the score decision unit 108 to the aggregation unit 109.

<Processing Sequence>

The procedure of processing executed by the information processing apparatus 100 according to the first embodiment will be described with reference to FIG. 2. In step S201, the processing target data input unit 101 loads processing target data. In step S202, the parameter setting unit 102 sets a plurality of candidate values of a parameter. In step S203, the processing execution unit 103 executes processing on the processing target data for each candidate value, and acquires a processing execution result.

In step S204, the statistical processing unit 107 checks the similarities in the first embodiment as the relationships between the processing execution results. In step S205, the representative data selection unit 104 selects, as representative data, a pair of the processing execution results having low similarity. In step S206, the display control unit 105 prompts the user to select desired data from the representative data on the display screen by displaying the selected representative data. In step S207, the operation unit 106 accepts the selection operation of the user.

In step S208, the score decision unit 108 decides the score of each candidate value based on the relationship between each processing execution result and user selection information based on the selection operation by the operation unit 106. In step S209, the score decision unit 108 determines whether the score decision processing has ended for all the processing target data. If the score decision processing has not ended, the processes in steps S203 to S209 are repeated; otherwise, the process advances to step S210.

In step S210, the aggregation unit 109 performs aggregation for all the processing target data using the scores decided by the score decision unit 108. In step S211, the aggregation unit 109 decides the appropriate value of the parameter based on the aggregation result, and outputs it to the parameter setting unit 102. In step S212, the display control unit 105 displays, on a confirmation screen, the appropriate value of the parameter decided based on the aggregation result, thereby ending the series of processes.

With the above processing, it is possible to decide the appropriate parameter for all the processing target data while reducing the load of the user.

<Processing Contents of Each Constituent Element>

Subsequently, the processing contents of each constituent element of the information processing apparatus 100 will be described in detail with reference to FIGS. 3A, 3B, and 4A to 4D. In the first embodiment, an image including a person is set as processing target data. As the processing executed by the processing execution unit 103 for the processing target data, a model for extracting the contour of the person in the image is applied. In this embodiment, the parameter of interest is a learning count as one parameter concerning model generation.

The processing target data input unit 101 will be described first. The processing target data input unit 101 has a function of inputting processing target data prepared by the user. For an input operation, the user designates a file of processing target data or a folder storing the processing target data. In the first embodiment, a large number of image files each including a person are designated and loaded.

Next, the parameter setting unit 102 will be described. The parameter setting unit 102 sets a plurality of candidate values for the parameter of interest. As a setting method, a file in which a plurality of candidate values are described is prepared, and designated. Alternatively, the user is prompted to input candidate values on the display screen. The first embodiment assumes that the parameter of interest is a learning count, and the candidate values are α1, α2, α3, α4, and α5. After setting the candidate values, a learning model is prepared for each candidate value. That is, in this embodiment, five learned models with different learning counts like a learning model learned by setting the learning count to α1 and a learning model learned by setting the learning count to α2 are prepared.

Figure 3A:
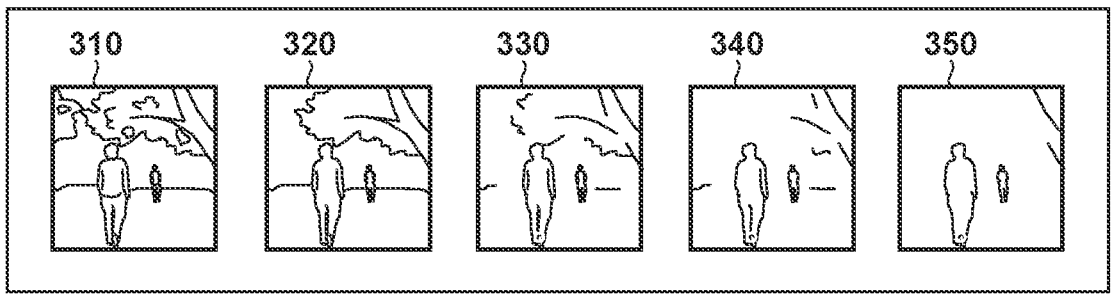
FIG. 3A is a view for explaining processing execution results and an example of a display screen.

Next, the processing execution unit 103 will be described. The processing execution unit 103 acquires a plurality of processing execution results by executing, for each processing target data, the processing using all the candidate values. In the first embodiment, the contour of a person is extracted by applying, to the processing target data, the models generated by the different learning counts, thereby acquiring score maps as processing execution results. The score map is data of the same size as that of the processing target data, and is an image storing, in each pixel, the probability that the pixel is likely the counter of a person. FIG. 3A shows images of the score maps as the processing execution results. Images 310, 320, 330, 340, and α350 are processing execution results obtained by executing the processing for given processing target data image1, and correspond to the candidate values α1, α2, α3, α4, and α5, respectively.

Next, the representative data selection unit 104 will be described. The representative data selection unit 104 selects a plurality of representative data from the plurality of processing execution results. As a selection method, there is provided a method of making a selection based on the relationships between the processing execution results. In the first embodiment, the similarity between the processing execution results is checked as the relationship. The similarity can be checked by calculating the degree of similarity between the processing execution results, and a pair of the processing execution results having low similarity is selected and set as representative data. The degree of similarity between the processing execution results is calculated by, for example, obtaining the correlation between the score maps. Information obtained by checking the relationship will be referred to as a relationship check result.

FIG. 4A shows an example of the relationship check result in the processing target data image1. A table shown in FIG. 4A stores a result of calculating the degree of similarity for each of pairs of the processing execution results corresponding to the candidate values α1 to α5 of the parameter. This example pays attention to a pair having the lowest degree of similarity indicated by a dotted line region 410, and the images 310 and 350 as the processing execution results corresponding to α1 and α5 as a pair of the corresponding candidate values are selected as representative data.

Next, the display control unit 105 will be described. The display control unit 105 generates a display image and outputs it to the screen of the display device 1007. The display screen includes a work screen and a confirmation screen. The work screen will be described first, and the confirmation screen will be described later.

Figure 3B:
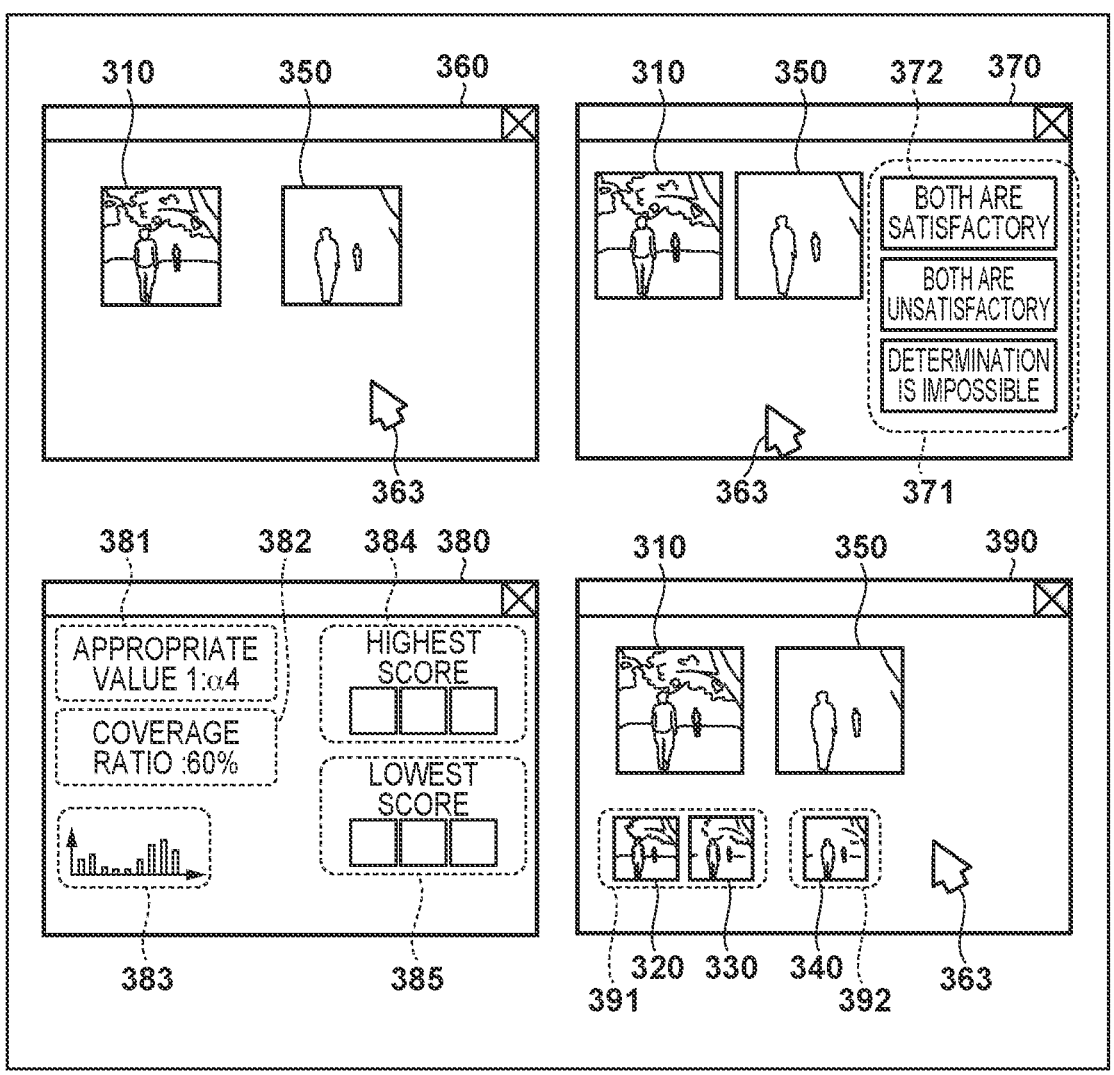
FIG. 3B is a view for explaining the processing execution results and examples of the display screen.

The work screen is a screen during a work for prompting the user to perform an operation, and is basically a screen for prompting the user to perform a selection operation by displaying the representative data. An image 360 of FIG. 3B shows an example of the work screen. The image 360 is a most basic example of the work screen, on which the images 310 and 350 as the representative data are displayed. On the display screen, the processing target data may be displayed in addition to the representative data. Display of the processing target data and the representative data on the same display screen allows the user to confirm the images before and after the processing is applied, thereby making it easy to make selection determination.

An image may be created by superimposing the representative data on the processing target data, and displayed on the display screen. By displaying the superimposed image, the user can more easily understand the correspondence between the positions of the processing target data and the representative data. When superimposing the data, the processing execution result (in this example, the score map) may be set to a transparent color. This improves the visibility.

In case that the user hesitates to make a selection, choices (choices concerning the quality of the representative data) of "both are satisfactory". "both are unsatisfactory", and "determination is impossible" may be displayed on the display screen in addition to the representative data. These choices will be referred to as choices prepared in case that the user hesitates to make determination hereinafter. An image 370 of FIG. 3B shows a practical example. The image 370 represents a work screen, on which choices 371 prepared in case that the user hesitates to make determination are displayed in addition to the images 310 and 350 as the representative data. As described above, by providing the choices prepared in case that the user hesitates to make determination, the user need not select desired data from the representative data every time. Thus, when the representative data that are difficult to select are displayed, it is possible to reduce the time during which the user hesitates to make a selection.

Subsequently, the operation unit 106 will be described. The operation unit 106 accepts a user operation of selecting subjectively preferable data as user selection data from the plurality of representative data displayed on the display screen. More specifically, the user performs a selection operation by moving a mouse pointer 363 over one of the representative data on the work screen 360 and clicking it. If the choices prepared in case that the user hesitates to make determination are displayed on the display screen, the user can select one of the choices by the operation unit 106. For example, if the user determines that both the images 310 and 350 as the representative data are satisfactory on the work screen 370, he/she performs a selection operation by moving the mouse pointer 363 to a choice 372 indicating text "both are satisfactory" and clicking it.

The user selection data or the information of the choice prepared in case in that the user hesitates to make determination and selected by the user, which is acquired by the operation unit 106, is recorded as user selection information in the user selection information holding unit 110 for each processing target data. A description will be provided by assuming that the user selects, by the operation unit 106, the image 350 as the representative data corresponding to 0.5.

Next, the score decision unit 108 will be described. The score decision unit 108 decides a score for each candidate value with respect to each processing target data based on the relationship (in this example, the similarity) between the user selection information and the processing execution result. A score decision method will be described with respect to each of a case in which the information of the user selection data is stored as the user selection information and a case in which the information concerning the choice prepared in case that the user hesitates to make determination and selected by the user is stored.

The first case in which the information of the user selection data is stored as the user selection information will be described. In this case, a score is given to each of the candidate value corresponding to the user selection data and the candidate value corresponding to the processing execution result having high similarity with the user selection data.

As a method of giving a score, there is provided a method of setting, as a score, the degree of similarity between the user selection data and the processing execution result of each candidate value. By setting the degree of similarity as a score, a higher score is given as the similarity with the user selection data is higher. As a practical example, FIG. 4B shows an example of a score table when the user selects the image 350 (the processing execution result of the candidate value α5) as the user selection data from the images 310 and 350 as the representative data. Each row of the score table shown in FIG. 4B stores the score of each candidate value for each processing target data. In this example, since the candidate value corresponding to the user selection data is α5, a dotted line region 420 indicating the degree of similarity between the processing execution result of a and that of each of the remaining candidate values in the relationship check result shown in FIG. 4A is referred to, and the information is stored in a portion indicated by a dotted line 430 in the score table.

Note that the scores are given to all the candidate values in the above example. However, the target given with the score may be only the candidate value of the processing execution result having a high degree of similarity with the user selection data. More specifically, among the processing execution results, the processing execution result having a higher degree of similarity with the user selection data than that of the other representative data is selected, and a positive value is given as the score of the candidate value corresponding to the selected processing execution result, and zero is given as the scores of the remaining candidate values.

An example ill be described using the relationship check result shown in FIG. 4A. Attention is paid to a dotted line region 470 and the dotted line region 420 as the degrees of similarity with the candidate values α1 and 5 of the parameter corresponding to the representative data. In the first embodiment, since the processing execution result of α5 is the user selection data, which of the candidate values has a higher degree of similarity with α5 than that with α1 is checked. Since the corresponding candidate value is only α4, a positive score is given to each of α4 and α5. In this way, by giving a score to only the candidate value of the processing execution result having higher similarity with the user selection data, it is possible to reduce the risk of giving a score against the intention of the user.

Next, the second case in which the information concerning the choice (the choice concerning the quality of the representative data) prepared in case that the user hesitates to make determination is stored as the user selection information will be described. In this case, based on the selection contents, the score is decided for each of all the candidate values including the candidate values of data other than the representative data. For example, if the user selects the choice of "both are satisfactory", a positive score is equally given to all the candidate values. If the user selects the choice of "both are unsatisfactory", a negative score is equally given to all the candidate values. If the user selects the choice of "determination is impossible", zero is set to all the candidate values. In addition, if the user selects one of these choices, the processing target data may be excluded from the score decision target, and may not be scored. As described above, the use of the information concerning the choice prepared in case that the user hesitates to make determination makes it possible to decide a score by more flexibly reflecting the intention of the user.

Next, the aggregation unit 109 will be described. The aggregation unit 109 performs processing after the processes of the representative data selection unit 104, the display control unit 105, the operation unit 106, and the score decision unit 108 are repeatedly executed while changing the processing target data. The aggregation unit 109 aggregates the scores decided by the score decision unit 108, thereby deciding an appropriate value from the candidate values. In the first embodiment, the aggregation processing generates a histogram of the scores for each candidate value, and decides, as the appropriate value of the parameter, the candidate value having the highest score as a result of the aggregation processing.

More specifically, in the score table shown in FIG. 4B, the sum of scores is calculated for each candidate value, and an aggregation result is obtained, as indicated by a dotted line region 440. In this example, the aggregation result of the candidate value α4 is highest, and thus the candidate value α4 is decided as an appropriate value.

Note that there are two timings of performing aggregation processing by the aggregation unit 109. The first timing is a timing immediately after the score decision unit 108 decides the scores for each processing target data. This aggregation processing is performed the number of times equal to the number of images of the processing target data at most. However, aggregation can collectively be performed for a plurality of processing target data without performing aggregation every time the scores are decided. The second timing is a timing when decision of the scores for all the processing target data ends, and this aggregation processing is performed only once. To discriminate between these aggregation processes, a result obtained by the former processing will be described as a midway aggregate result hereinafter and a result obtained by the latter processing will be described as a final aggregation result hereinafter.

After the processing of the aggregation unit 109, the display control unit 105 displays a confirmation screen. The confirmation screen is a screen for prompting the user to confirm the result after the appropriate value is decided. On a confirmation screen 380 shown in FIG. 3B, information concerning the scores, the processing execution result when the appropriate value of the parameter is used, and a coverage ratio (to be described later) are displayed in addition to the appropriate value of the parameter decided by the aggregation unit 109. An example of display of the parameter finally decided as the appropriate value is shown in a dotted line region 381 of the confirmation screen 380.

As an example of display of the information concerning the scores, a histogram of the final aggregation result is shown in a dotted line region 383. Note that the information concerning the scores can be displayed not only on the confirmation screen but also on the work screen by obtaining a midway aggregation result, as needed. If the histogram is displayed, the user can grasp a range within which a relatively satisfactory result is obtained among all the candidate values of the parameter.

An example of the processing execution result obtained when the appropriate parameter value is used is shown in each of dotted line regions 384 and 385. The dotted line regions respectively show examples of acquiring the highest score and the lowest score when the candidate value is used. By displaying various processing execution results obtained by the decided candidate value in this way, it is possible to prompt the user to finally confirm that the candidate value is adopted.

The coverage ratio is information concerning the occupation ratio of the processing execution result desirable for the user when executing the processing for all the processing target data using the parameter value decided by the aggregation unit 109. More specifically, the ratio between the total number of processing target data and the number of processing target data each of which obtains the score equal to or higher than a predetermined value such as 0.5 with the parameter decided by the aggregation unit 109 is calculated. An example of display of the coverage ratio is shown in a dotted line region 382. By displaying the coverage ratio, the user can grasp the effectiveness of the finally decided appropriate parameter with respect to all the processing target data.

The above-described processes of the respective constituent elements can decide the appropriate value of the parameter.

<Use of Midway Aggregation Result>

The midway aggregation result calculated by the aggregation unit 109 can be used for the purpose of deciding a more appropriate parameter. A method of using the midway aggregation result by the parameter setting unit 102 and the display control unit 105 will be described below.

The use method in the parameter setting unit 102 will be explained first. The parameter setting unit 102 can change the candidate value in the middle based on the midway aggregation result. If there is a candidate value that is highly probably an appropriate value in the midway aggregation result, values before and after the candidate value may include the parameter preferred by the user. To the contrary, if there is a candidate value that is not likely an appropriate value in the midway aggregation result, it is considered that the processing execution result of the candidate value need not be observed any more. Therefore, if the midway aggregation result is checked and the total value of the scores of a specific candidate value is conspicuously high, values before and after the candidate value are added as candidate values. On the other hand, if the midway aggregation result is checked and the total value of the scores of the specific candidate value is conspicuously low, the candidate value is deleted from the candidate values.

After adding or deleting the candidate value, the processing execution unit 103 executes the processing using the modified candidate values. However, although the added candidate value is added because it may be a more appropriate value, the candidate value acquires no score at the time of addition, and is thus difficult to finally obtain a high score. Therefore, a score is set as the midway aggregation result of the added candidate value based on the total score of the close candidate value at this time. For example, the same score as the midway aggregation result of the candidate value closest to the added candidate value is set as the midway aggregation result of the added candidate value. Since, as described above, the unnecessary candidate value can be deleted when the parameter setting unit 102 uses the midway aggregation result, the efficiency of the series of processes can be improved. Furthermore, since the candidate values can be limited by centering the more preferable value for the user, a more appropriate parameter can be found with a higher probability.

Next, the use method in the display control unit 105 will be described. The display control unit 105 performs the same display again when the user selects the representative data corresponding to the candidate value with a low score (for example, a score equal to or lower than a predetermined value) in the midway aggregation result. The reason why the display is performed again is that it is interpreted that the user may perform an operation erroneously and the user is thus made to perform reconfirmation. The timing of performing the display again may be a timing immediately after display of the processing target data or a timing after display of another processing target data.

If the user selection data remains the same between the first and second operations, it is interpreted that the user operation for the processing target data is not an erroneous operation, and scores are decided for the processing target data, as usual. On the other hand, if the user selection data is different between the first and second operations, it is interpreted that the first operation is an erroneous operation. Then, scores for the processing target data are invalidated or scores are decided using the user selection data selected by the second operation. As described above, when the display control unit 105 uses the midway aggregation result, the scores obtained by the erroneous operation of the user can be invalidated, and it is thus possible to improve the reliability of the aggregation result. As a result, it can be expected to decide a more appropriate parameter.

As described above, it is possible to improve the efficiency and reliability of the series of processes using the midway aggregation result.

<Operation of Information Concerning Relationship>

Next, a method in which the display control unit 105 displays the information concerning the relationship between the processing execution results on the work screen will be described.

The relationship between the processing execution results is information concerning data similar to the representative data. As a display method, a thumbnail of the processing execution result having high similarity with the representative data is displayed around the representative data on the display screen.

An example of display of the relationship between the processing execution results is shown in each of dotted line regions 391 and 392 of an image 390 shown in FIG. 3B. The dotted line region 391 is displayed near the image 310 as the representative data, and indicates that each processing execution result included in the region has a higher degree of similarity with the image 310 as the representative data than that with the image 350 as the representative data. Furthermore, the dotted line region 372 is displayed near the image 350 as the representative data, and indicates that the processing execution result included in the region has a higher degree of similarity with the image 350 as the representative data than that with the image 310 as the representative data. By displaying the information concerning the relationship between the processing execution results in this way, the user can readily recognize that the candidate value corresponding to a specific processing execution result is given with a high score by selecting the representative data.

Furthermore, when the relationship between the processing execution results is displayed, the relationship may be changeable by the operation unit 106. A method in which an operation of changing the information concerning the relationship is performed by the operation unit 106 and the score decision unit 108 changes the score in accordance with the operation will be described below.

The timing of changing the information concerning the relationship is a timing when it is found that the processing execution results displayed as data similar to the representative data to be selected by the user include data unpreferable for the user. At this time, by changing the information concerning the relationship by a user operation, a score is prevented from being given to the candidate value corresponding to the unpreferable processing execution result.

More specifically, although the user is to select the representative data 310 on the work screen 390 shown in FIG. 3B, the processing execution result 330 among the processing execution results displayed as data similar to the representative data 310 is unpreferable for the user. At this time, the user drags the mouse pointer 363 from the position of the image 330 as the processing execution result to the position of the dotted line region 392. This operation can prevent a score from being given to the candidate value corresponding to the image 330 as the processing execution result even if the image 310 as the processing execution result is selected as the user selection data.

Note that in this embodiment, the processing target data is an image obtained by image capturing. However, the present invention is not limited to this, and vector data, a moving image, three-dimensional data, or polyline data may be used. The image may be a grayscale image or a color image. Furthermore, the processing target data may be data obtained by processing an image or an edge image obtained by performing edge extraction processing for an image.

This embodiment has explained, as processing using a parameter, the processing of applying a model generated by machine learning to the processing target data. However, the processing contents are not limited to this, and general image processing may be performed. More specifically, the image processing includes edge extraction processing and threshold processing. If the processing using a parameter is edge extraction processing, the parameter of interest is a file size or a filter type. If the processing using a parameter is threshold processing, the processing target data is an edge image and the parameter of interest is a threshold.

Furthermore, in this embodiment, as a method of selecting representative data by the representative data selection unit 104, the method of checking the similarity by calculating the degree of similarity between the processing execution results and selecting representative data based on the degree of similarity has been explained. However, the representative data selection method is not limited to this.

For example, the representative data selection unit 104 may select the representative data based on information obtained by integrating the processing execution result and the processing target data. More specifically, a module (for example, Deep Learning architecture) of performing similarity determination of a new feature vector or the like obtained by integrating the feature vector of the processing target data and the processing execution results or general similarity determination with respect to the processing target data and the processing execution results is created. The representative data are selected using such module. Alternatively, instead of explicitly evaluating or calculating the similarity, a module of outputting representative data by receiving a plurality of processing execution results and the processing target data can be created and used. As described above, the use of the information of the processing target data as well as the processing execution results makes it possible to select representative data by focusing on an important region on the processing target data. Alternatively, representative data may be decided randomly.

Note that this embodiment has explained the method of setting a plurality of different candidate values by focusing on one parameter but two or more parameters may be targeted. If there is one parameter, processing of acquiring a processing execution result for each candidate value and deciding a score for each candidate value is repeated to decide an appropriate candidate value. On the other hand, if there are two parameters, processing of acquiring a processing execution result for each pair of candidate values and deciding a score for each pair of candidate values is repeated to finally decide an appropriate pair of parameters.

This embodiment has explained the method of using the information of the relationship between the processing execution results checked in step S204 in the flowchart of FIG. 2 to select representative data in step S205 and decide a score in step S208. However, the use of the relationship check result is essential to decide a score in step S208 but is not essential to select representative data in step S205, and thus the processing in step S204 may be executed at any stage between steps S203 and S208.

This embodiment has explained the method of repeating, for each processing target data, the processes from a process of acquiring the processing execution results in step S203 to a process of deciding the score in step S208, but the processes can be performed at once for all the processing target data. Note that in this embodiment, the aggregation unit 109 obtains, in step S210, the final aggregation result after deciding the scores of all the processing target data. However, the aggregation processing may be performed, as needed, every time the score is decided for the processing target data. By performing the aggregation processing, as needed, it is possible to use the midway aggregation result, as described above, resulting in improvement of the efficiency and reliability of the series of processes.

Second Embodiment

The first embodiment has explained the method of checking the relationship between the processing execution results based on the similarity and deciding the score based on the user selection information and the similarity. To the contrary, the second embodiment will describe a method of checking the relationship between processing execution results by grouping the processing execution results based on a data distribution and deciding a score based on the group.

In the first embodiment, the aggregation unit 109 performs aggregation processing by generating a histogram for each candidate value, and sets, as an appropriate value, a candidate value having a highest score. To the contrary, the second embodiment will describe a method in which an aggregation unit 109 calculates a candidate value located at the barycenter on a parameter space using a score and sets the calculated candidate value as an appropriate value.

The second embodiment assumes that processing target data is an edge image obtained by performing edge extraction for an image including a person. The edge image is a grayscale image of the same size as that of the image, and is two-dimensional data that stores a pixel value close to 1 in a portion including an edge and storing a pixel value close to 0 in a portion including no edge on the image before edge extraction is applied. Assume that processing performed by a processing execution unit 103 is threshold processing and a parameter of interest is a threshold.

Note that the arrangement of an information processing apparatus according to this embodiment is the same as that described with reference to FIGS. 1A and 1B in the first embodiment and the procedure of processing is the same as that in the flowchart of FIG. 2. However, the degree of similarity is calculated when checking the relationship in the first embodiment but information concerning a group is obtained in the second embodiment.

<Processing Contents of Each Constituent Element>

The processing contents of each constituent element according to the second embodiment will be described. A processing target data input unit 101 inputs, as processing target data, a data group of an edge image obtained by performing edge extraction for an image group including a person. Different thresholds are set as candidate values of a parameter, and are assumed to be $\alpha 1$, $\alpha 2$, $\alpha 3$, $\alpha 4$, and $\alpha 5$.

The processing execution unit 103 performs the threshold processing for the processing target data using all the candidate values. Images 310, 320, 330, 340, and $\alpha 350$ shown in FIG. 3A are examples of processing execution results corresponding to the candidate values $\alpha 1$, $\alpha 2$, $\alpha 3$, $\alpha 4$, and $\alpha 5$.

A representative data selection unit 104 groups a plurality of processing execution results obtained by the plurality of candidate values, and selects, as representative data, one processing execution result from each group. Grouping is executed by clustering, for each processing target data, processing execution results obtained by the different candidate values. Clustering is a method of classifying the data group into a plurality of groups based on a data distribution.

FIG. 4C shows an example of a relationship check result by grouping in one processing target data image1. Each of g1 and g2 indicates a group to which each processing execution result belongs. This table indicates that $\alpha 1$, $\alpha 2$, and $\alpha 3$ belong to the group g1 and $\alpha 4$ and $\alpha 5$ are classified into the group 2 by grouping.

As a method of selecting representative data from each group, there is provided a method of making a selection based on the processing execution results and a method of making a selection based on the candidate values of the parameter. In the method of making a selection based on the processing execution results, the processing execution result closest to the center of the group on the grouped space is set as representative data.

There are provided two methods of making a selection based on the candidate values. The first method is a method of obtaining the average value of the candidate values for each group and setting, as representative data, the processing execution result of the candidate value close to the average value. The second method is a method of acquiring the processing executing result again using the average value as the value of the parameter when the candidate values include no value matching the average value, and setting the acquired processing executing result as representative data. Alternatively, when selecting representative data from each group, representative data may be selected randomly. The second embodiment assumes that the representative data selection unit 104 selects the processing execution results of the candidate values $\alpha 1$ and $\alpha 5$ as representative data of the groups g1 and g2, respectively.

After a display control unit 105 displays the representative data and a user operation is performed by an operation unit 106, a score decision unit 108 gives a score to each candidate value. In the second embodiment, a score is decided based on whether the processing execution result belongs to the same group as that of user selection data. As a method of giving a score, there is provided a method of equally giving a score to the group to which the user selection data belongs. For example, assume that the processing execution result of $\alpha 5$ is selected as the user selection data. When paying attention to the processing target data image1 of the relationship check result shown in FIG. 4C, the group g2 to which the user selection data belongs includes the candidate values $\alpha 4$ and $\alpha 5$. Therefore, in a score table shown in FIG. 4D, a score is equally given to $\alpha 4$ and $\alpha 5$, as indicated by a dotted line region 450.

As another method of giving a score, in the group to which the user selection data belongs, the similarity between the user selection data and each processing execution result is checked, the degree of similarity may be given as a score to only each candidate value of the group and the score of each candidate value of the other group may be set to zero.

Next, the aggregation unit 109 will be described. The aggregation unit 109 according to the second embodiment checks the candidate value located at the barycenter on the parameter space using the score, and sets it as an appropriate value. The total value of the scores acquired by the respective candidate values is obtained, the barycenter on the parameter space is obtained using the total value and the candidate values, and then the barycenter is regarded as the appropriate value of the parameter. More specifically, as indicated by a dotted line region 460 in FIG. 4D, the total score is obtained for each candidate value, and then the barycenter of the candidate values is obtained using expression (1) below, thereby deciding the appropriate value.

$$\frac{\sum_{i=1}^{n} xi \cdot \alpha i}{\sum_{i=1}^{n} xi} \quad (1)$$

Note that xi represents the total score of each candidate value, $\alpha i$ represents the candidate value, and a subscript i takes a different value for each candidate value. Assume also that n represents the number of candidate values. As described above, the processing of obtaining the barycenter is processing that considers the fact that the setting values set by a parameter setting unit 102 do not always include an appropriate parameter. By deciding the appropriate value from the barycenter, it may be possible to find a more appropriate candidate value.

As described above, in this embodiment, the group of the processing execution result is checked as the relationship, a score is decided based on the group, and the barycenter is used for aggregation processing. This can improve the probability that a more appropriate candidate value is found.

Third Embodiment

In each of the first and second embodiments, the representative data are displayed only once for each processing target data. To the contrary, in the third embodiment, representative data are displayed a plurality of times for each processing target data. More specifically, if there are three or more representative data, the representative data are displayed while changing a pair of displayed representative data for each processing target data in consideration of the fact that a result of selection by the user changes as the pair is changed. The third embodiment will particularly describe a method of analyzing a plurality of pieces of user selection information obtained for each processing target data, acquiring information concerning the order of the candidate values, and deciding a score based on the order.

In the third embodiment, an image (for example, an image of a size of 640 pixels×480 pixels) including scenery and a person is processed as processing target data for the purpose of deciding a parameter with which the user subjectively feels beautiful. Assume that processing executed by a processing execution unit 103 is brightness conversion processing and a parameter of interest is a brightness conversion parameter.

<Functional Arrangement of Information Processing Apparatus>

Figure 5:
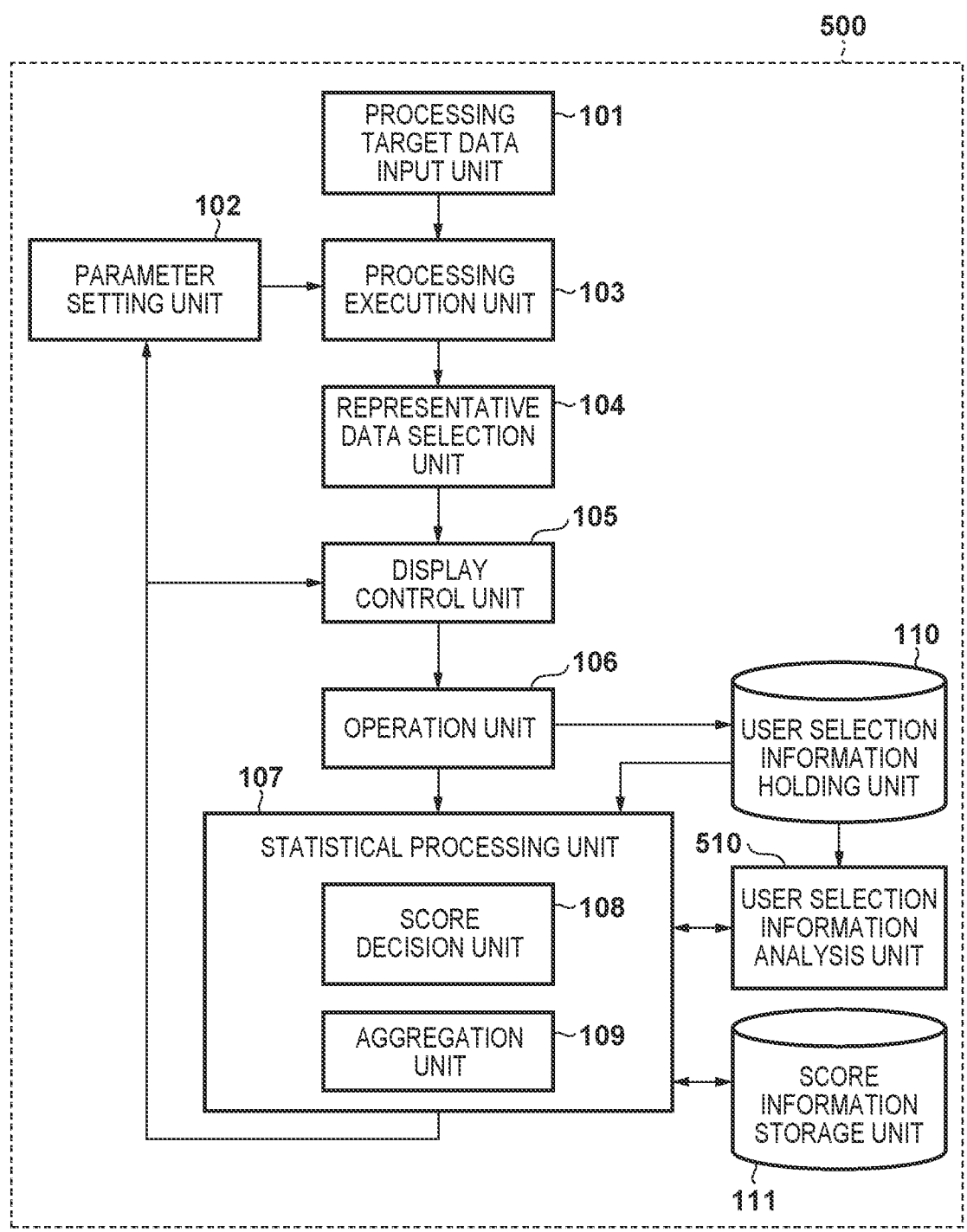
FIG. 5 is a block diagram showing the functional arrangement of an information processing apparatus according to another embodiment.

FIG. 5 is a block diagram showing the functional arrangement of an information processing apparatus 500 according to the third embodiment. In the third embodiment, a user selection information analysis unit 510 is added to the arrangement of the information processing apparatus 100 described with reference to FIGS. 1A and 1B in the first embodiment.

The user selection information analysis unit 510 receives, from a user selection information holding unit 110, a plurality of pieces of user selection information for given processing target data, acquires a user selection information analysis result based on the user selection information, and sends the user selection information analysis result to a score decision unit 108. Upon receiving the user selection information analysis result from the user selection information analysis unit 510, the score decision unit 108 decides a score of each candidate value based on the relationship between the user selection information analysis result and a processing execution result.

<Processing Sequence>

The procedure of processing executed by the information processing apparatus 500 according to the first embodiment will be described with reference to FIG. 6. Processes from when a processing target data input unit 101 loads processing target data in step S201 until a statistical processing unit 107 checks the relationship between processing execution results in step S204 are the same as in the first and second embodiments. In step S205, a representative data selection unit 104 selects two representative data in the first and second embodiments but selects three or more representative data in the third embodiment.

Subsequently, in step S601, a display control unit 105 selects, from the representative data, one pair of data to be displayed on a display screen. In step S206, the representative data selection unit 104 prompts the user to select preferable data by displaying the representative data. In step S207, an operation unit 106 accepts a selection operation of the user. In step S602, the user selection information holding unit 110 records user selection information.

In step S603, the display control unit 105 determines whether all possible pairs of the representative data have been selected and displayed. If not all the pairs have been displayed, the process returns to step 601 in which a pair is selected from the representative data. On the other hand, if all the pairs have been displayed, the process advances to step S604.

In step S604, the user selection information analysis unit 510 analyzes the user selection information. In step S605, the score decision unit 108 decides the score of each candidate value for one processing target data based on the relationship between the user selection information analysis result and the processing execution result.

Subsequently, in step S209, the score decision unit 108 determines whether the score of each candidate value has been decided for all the processing target data. If the score has not been decided for all the processing target data, the process returns to step S203, and the processing execution unit 103 applies the processing to the next processing target data to acquire processing execution results. On the other hand, if the score has been decided for all the processing target data, the process advances to step S210.

In step S210, an aggregation unit 109 aggregates the scores. In step S211, the aggregation unit 109 decides an appropriate value of the parameter. In step S212, the display control unit 105 displays a confirmation screen with respect to the decided parameter.

<Processing Contents of Each Constituent Element>

The processing contents of each constituent element according to the third embodiment will be described. First, the processing target data input unit 101 acquires a plurality of images as processing target data. Next, the parameter setting unit 102 sets a plurality of setting values of a parameter concerning brightness. In this example, $\alpha 1$, $\alpha 2$, $\alpha 3$, $\alpha 4$, and $\alpha 5$ are set as candidate values. Then, the processing execution unit 103 performs brightness conversion for processing target data image1 using the candidate values $\alpha 1$ to $\alpha 5$, thereby acquiring a plurality of processing execution results.

Subsequently, assume that the processing execution unit 103 groups the processing execution results by clustering as in the second embodiment in order to check the relationship between the processing execution results, and thus obtains a relationship check result shown in FIG. 7A. A table of FIG. 7A shows a group to which each candidate value belongs, and indicates that the processing execution results of $\alpha 1$ and $\alpha 2$ belong to a group g1, the processing execution results of $\alpha 3$ and $\alpha 4$ belong to a group g2, and the processing execution result of $\alpha 5$ belongs to a group g3.

Next, the representative data selection unit 104 randomly selects representative data from each group based on the relationship check result. Assume here that the processing execution results of $\alpha 1$, $\alpha 3$, and $\alpha 5$ are selected.

The display control unit 105 changes a pair to be displayed among the processing execution results of the candidate values $\alpha 1$, $\alpha 3$, and $\alpha 5$, and displays it. Upon confirming the display, the user performs a selection operation of user selection data using the operation unit 106.

Each row of a table shown in FIG. 7B shows a user selection result when changing the pair of representative parameters to be displayed. The candidate value of the user selection data is set with 1, the other candidate value is set with 0, and the non-displayed candidate value is set with NULL. FIG. 7B indicates that when pairs of α1 and α3, α1 and α5, and α3 and α5 are displayed respectively, α1, α1, and α3 are selected respectively.

The user selection information analysis unit 510 performs aggregation for each candidate value of the parameter with reference to the user selection information concerning the processing target data image1 to obtain information concerning the order of the candidate values as a user selection information analysis result. FIG. 7C shows an example of the information concerning the order according to the third embodiment. In this example, in three attempts to change the pair of representative data, user selects α1 twice, α3 once, and α5 0 times, and thus 2, 1, and 0 are stored for α1, α3, and α5, respectively.

The score decision unit 108 decides a score based on the relationship between the processing execution results and the information concerning the order obtained as the user selection information analysis result. In the third embodiment, a score table shown in FIG. 7D is created based on FIGS. 7A and 7C. The scores of α1, α3, and α5 are differentiated in accordance with the information concerning the order in FIG. 7C. The candidate value of the same group is given with the same score based on the relationship check result shown in FIG. 7A.

Note that in this example, there is a difference between the candidate values in the information concerning the order, as shown in FIG. 7C. If there is no difference, the score decision unit 108 need not give a score for such processing target data.

As described above, the use of the information concerning the order makes it possible to give a score in consideration of the fact that the result of selection by the user changes as the pair of representative data to be displayed is changed.

The above processing is repeatedly executed for all the processing target data, and the aggregation unit 109 performs aggregation, thereby deciding the appropriate value of the parameter.

As described above, this embodiment has explained the method in which the user selection information analysis unit 510 checks the information concerning the order and the score decision unit 108 reflects it.

Figure 6:
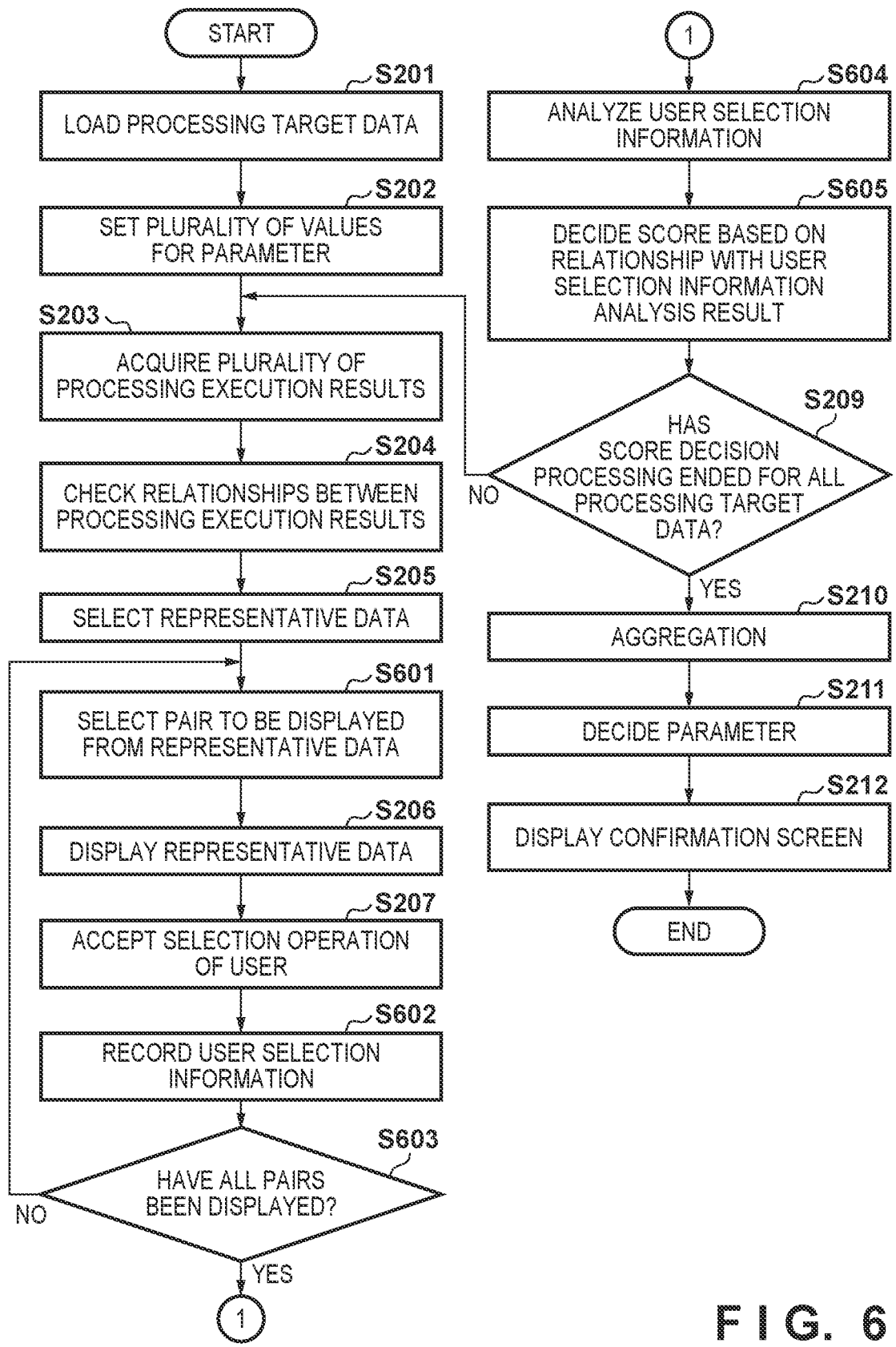
FIG. 6 is a flowchart for explaining the procedure of processing executed by the information processing apparatus according to the other embodiment.
Figure 8:
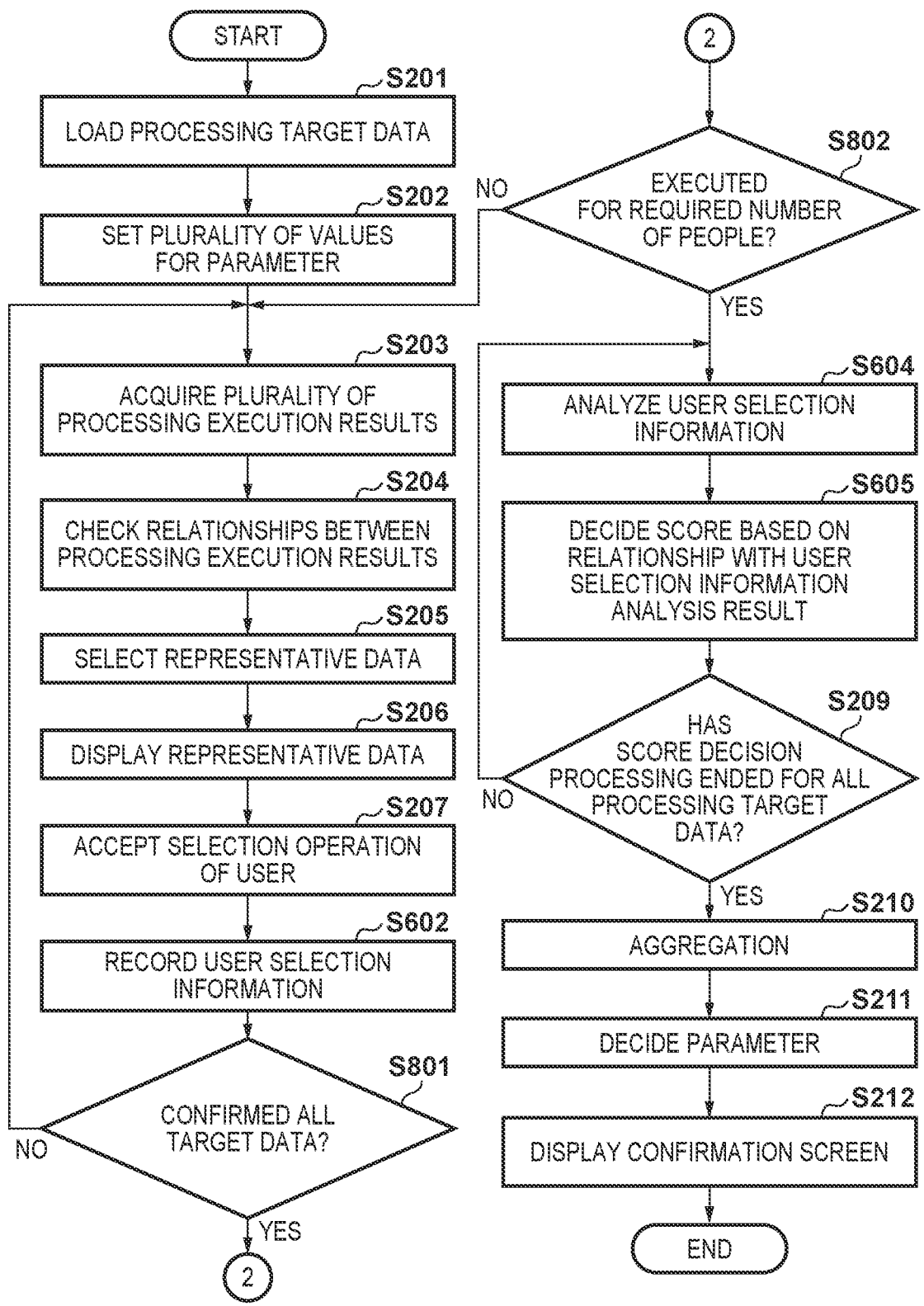
FIG. 8 is a flowchart for explaining the procedure of processing executed by the information processing apparatus according to the other embodiment.

Note that according to this embodiment, in the flowchart shown in FIG. 6, in the display processing, the pair of representative data is changed and displayed continuously for one processing target data. The present invention, however, is not limited to this. When changing the pair of representative data obtained from given processing target data a plurality of times and displaying it, representative data obtained from another processing target data may be displayed between the display operations.

Fourth Embodiment

Each of the first to third embodiments targets one user. However, the fourth embodiment will describe an example of targeting a plurality of users. Similar to the third embodiment, in the fourth embodiment, a score is decided using a user selection information analysis result acquired by a user selection information analysis unit 510. As the user selection information analysis result, the information concerning the order is used in the third embodiment but information concerning reliability (to be described later) is used in the fourth embodiment. The use of the information concerning reliability makes it possible to reduce the influence of the degree of experience (skill level) of the user on the score.

Assume that data to be processed in the fourth embodiment is a large wall surface image of an infrastructure. The fourth embodiment aims at deciding an appropriate parameter to acquire a result of detecting a variation portion such as lift of a wall surface.

The fourth embodiment assumes that processing of acquiring processing target data is performed in advance, and thus processing contents of the processing will be described first. A model for detecting a variation portion is generated first, and a score map that is data of the same size as that of the wall surface image and stores a value close to 1 in a pixel that is likely a variation and a value close to 0 in the remaining pixels is acquired by applying the model to the wall surface image. After that, polyline data is created using the score map, and set as processing target data.

Figure 9A:
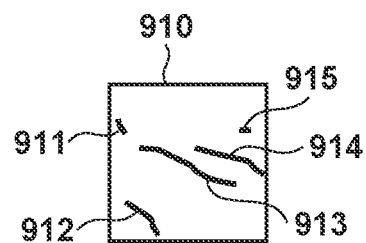
FIG. 9A is a view for explaining a processing execution result and an example of a display screen.

The polyline data is data formed from position information. As a polyline creation method, polyline data can be created by performing binarization and thinning processing for the score map, and then performing vectorization processing. In FIG. 9A, 910 shows an example of the polyline data according to the fourth embodiment. Line segments 911, 912, 913, 914, and 915 represent polyline data, and indicate the positions of portions that are likely variations. As in this example, the polyline data may be represented by a line segment connecting adjacent points or by a curve by holding formula information in addition to the position information.

In the fourth embodiment, as processing by a processing execution unit 103, a polyline of the polyline data, that may be erroneously detected, is removed. More specifically, since it is considered that an extremely short polyline may be obtained by erroneously detecting a hole or flaw on the wall surface instead of a crack or lift, the polyline is deleted. Assume that a parameter of interest is a polyline length as a removal reference.

The arrangement of an information processing apparatus according to the fourth embodiment is the same as that of the information processing apparatus 500 described with reference to FIG. 5 in the third embodiment and a description thereof will be omitted.

<Processing Sequence>

The procedure of processing executed by an information processing apparatus 500 according to the fourth embodiment that targets a plurality of users will be described with reference to FIG. 6. Processes from a process in which a processing target data input unit 101 loads processing target data in step S201 to a process in which an operation unit 106 accepts a selection operation of a user in step S207 are the same as in the first embodiment. After the processing in step S207, the process advances to step S602. In step S602, a user selection information holding unit 110 records user selection information, and the process advances to step S801.

In step S801, the processing execution unit 103 confirms whether the processes in steps S203 to S602 have been executed for all processing target data. If the processes have not been executed, the process returns to step S203; otherwise, the process advances to step S802. In step S802, the processing execution unit 103 confirms whether the processes in steps S203 to S801 have been executed for all the users. If the processes have not been executed for all the users, the process returns to step S203, and the processes in steps S203 to S801 are executed for the user for whom the processes have not been executed. On the other hand, if the processes have been executed for all the users, the process advances to step S604.

In step S604, the user selection information analysis unit 510 analyzes the user selection information. In step S605, a score decision unit 108 gives a score to each candidate value of the parameter based on the relationship between processing execution results and a user selection information analysis result.

In step S209, the score decision unit 108 determines whether the score decision processing has ended for all the processing target data. If the score decision processing has not ended, the process returns to step S604; otherwise, the process advances to step S210. In step S210, an aggregation unit 109 performs aggregation for all the processing target data using the scores decided by the score decision unit 108.

In step S211, the aggregation unit 109 decides the appropriate value of the parameter based on an aggregation result, and outputs it to a parameter setting unit 102. In step S212, a display control unit 105 displays, on a confirmation screen, the appropriate value of the parameter decided based on the aggregation result, and ends the series of processes.

<Processing Contents of Each Constituent Element>

The processing contents of each constituent element according to the fourth embodiment will be described with reference to FIGS. 9A to 9C and 10A to 10D. First, the processing target data input unit 101 inputs processing target data. For example, polyline data in a two-dimensional space of the same size as that of an original wall surface image is acquired from a large wall surface image by applying a model for detecting a variation or performing image processing such as thinning or polyline generation. In this example, a plurality of small regions of a size of about 500 pixels×500 pixels are extracted from the space of the large wall surface image, and set as processing target data.

The parameter setting unit 102 sets, as a parameter of interest, a polyline length as a polyline data removal reference, and sets $\alpha 1$, $\alpha 2$, $\alpha 3$, $\alpha 4$, and $\alpha 5$ as candidate values.

Figure 9B:
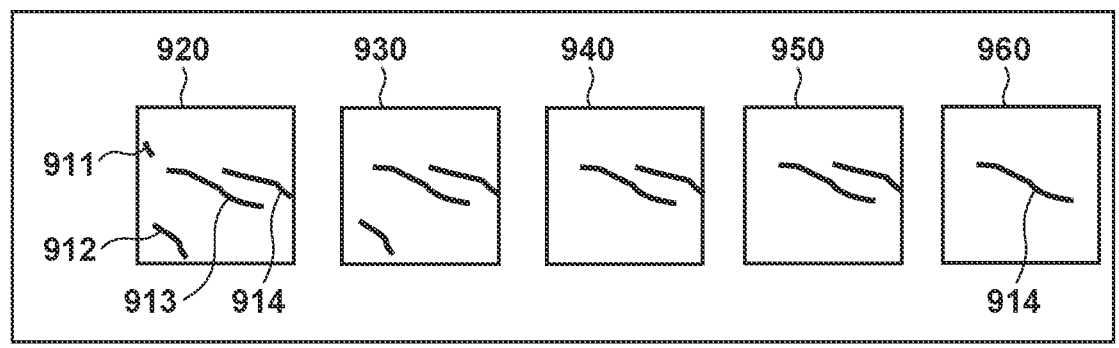
FIG. 9B is a view for explaining processing execution results and an example of the display screen.

The processing execution unit 103 receives the processing target data and the candidate values, and performs processing of removing a short polyline from the polyline data. FIG. 9B shows examples of processing execution results. Images 920, 930, 940, 950, and 960 represent processing execution results corresponding to the candidate values $\alpha 1$, $\alpha 2$, $\alpha 3$, $\alpha 4$, and $\alpha 5$. The processing execution results obtained when the polyline length as the removal reference is gradually increased are shown in order from the image 920 to the image 960.

After that, a representative data selection unit 104 selects representative data. Similar to the second embodiment, the fourth embodiment assumes that the processing execution results are grouped to obtain information shown in FIG. 10A as the relationship between the processing execution results. A table of FIG. 10A shows a group to which each candidate value belongs, and indicates that $\alpha 1$, $\alpha 2$, and $\alpha 3$ belong to a group g1 and $\alpha 4$ and $\alpha 5$ belong to a group g2. Assume here that the processing execution results of the candidate values $\alpha 1$ and $\alpha 5$ are randomly selected as representative data from the groups, respectively.

Next, the display control unit 105 displays the processing execution results of the candidate values $\alpha 1$ and $\alpha 5$ to the plurality of users, and the operation unit 106 performs an operation of causing the users to select user selection data. The display and operation timings need not be the same among the users. After accepting the operation from each user, the user selection information holding unit 110 stores user selection information. FIG. 10B shows an example of the user selection information concerning processing target data image1. Each row of the table shows a selection result when displaying the representative data to a different user, and 1 is stored for the representative data selected by each user and 0 is stored for the unselected representative data. In this example, users 1 and 2 select $\alpha 1$, and user 3 selects $\alpha 5$.

Next, the user selection information analysis unit 510 acquires, as a user selection information analysis result, information concerning reliability with respect to the processing target data image1. The information concerning reliability is a score for each candidate value obtained in consideration of the degree of experience of each user for a selection operation. More specifically, a large weight is given to the selection result of the experienced user, a small weight is given to the selection result of the unexperienced user, and then aggregation is performed to obtain a score. As a method of deciding an experienced user and an unexperienced user, there is provided a method of acquiring, in advance, pieces of user selection information by a plurality of users using another processing target data group, and considering, as an unexperienced user, a user who obtains, as selection contents, outliers more than other users. The fourth embodiment assumes that three users are targets, and users 1 and 2 are experienced and user 3 is unexperienced.

An expression for calculating the information concerning the reliability of each candidate value is given below.

$$\sum_{j=1}^{m} xj \cdot wj \tag{2}$$

Note that m represents the number of users, xj represents information concerning whether the user selects or not and takes 0 or 1, wj represents a weight considering the degree of experience for each user, and a subscript j takes a different value for each user. In this example, FIG. 10C shows an example of obtaining the information concerning the reliability by setting 1 as the weight of each of experienced users 1 and 2 and 0.5 as the weight of unexperienced user 3. Referring to FIG. 10C, $\alpha 1$ is selected by the two experienced users and thus given with 2, and $\alpha 5$ is selected by the one unexperienced user and thus given with 0.5. It is possible to reduce the influence of the degree of experience of the user on a score by performing score decision processing using the information concerning the reliability.

The score decision unit 108 decides a score based on the relationship between the processing execution results and the information concerning the reliability. In this example, a score table shown in FIG. 10D is created based on FIGS. 10A and 10C. Based on the information concerning the reliability shown in FIG. 10C, the score of $\alpha 1$ is 2 and the score of $\alpha 5$ is 0.5. Furthermore, the candidate value $\alpha 2$ of the same group is given with the same score as that of $\alpha 1$ based on the relationship check result shown in FIG. 10A. Similarly, the candidate values $\alpha 3$ and $\alpha 4$ of the same group are given with the same score as that of $\alpha 5$.

The above-described processing is repeatedly executed for all the processing target data, and the aggregation unit 109 performs aggregation, thereby deciding the appropriate value of the parameter.

After the appropriate value of the parameter is decided, the display control unit 105 displays a coverage range on the confirmation screen. The coverage range is information that can be displayed when processing a large image, and is the range of an image region where a processing execution result preferable for the user is obtained by a given candidate value. More specifically, in the score table, attention is paid to the score obtained by each processing target data when using the candidate value decided as the appropriate value by the aggregation unit 109, and the processing target data for which the score equal to or higher than a predetermined value is obtained is extracted.

Figure 9C:
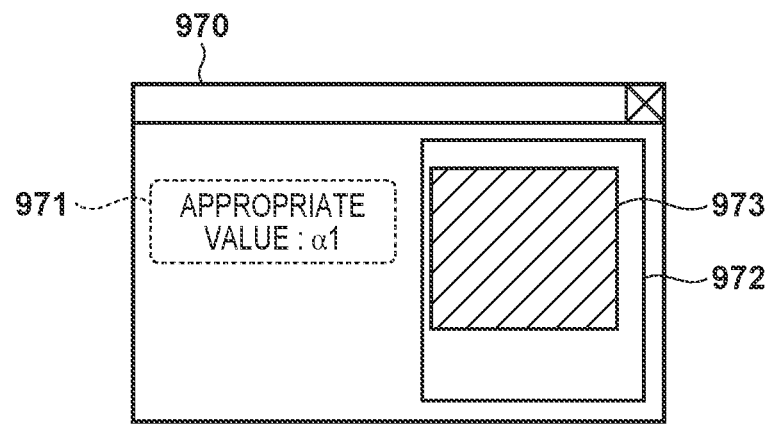
FIG. 9C is a view for explaining a processing execution result and an example of the display screen.

Then, a range occupied by the extracted processing target data with respect to the entire large image is drawn. FIG. 9C shows an example of a confirmation screen 970. In a dotted line region 971, the parameter decided as the appropriate value is displayed. An example of the coverage range is shown on the right side of the display image 970, and a region 973 in a large image 972 represents the coverage range by the decided parameter. By displaying the coverage range, the user can readily confirm a range suitable for the decided parameter in the large image.

As described above, in the fourth embodiment, the user selection information analysis unit 510 acquires the information concerning the reliability, and the score decision unit 108 reflects the information on the score, thereby making it possible to decide a more appropriate value of the parameter.

Note that each of the above-described third and fourth embodiments has explained the example of using the information concerning the order or the information concerning the reliability as the user selection analysis result checked by the user selection information analysis unit 510. On the other hand, time information from when the representative data are displayed until the user performs a selection operation can be used as the user selection information analysis result. In this case, it is necessary to record, as the user selection information, the time from when the representative data are displayed until the user selection information is acquired. If the time from when the representative data are displayed until the user performs a selection operation is long, it is interpreted that the user hesitates to determine which data is more preferable, as compared with a case in which the time is short, and the score decision unit 108 gives a low score. By using the time information in this way, it is possible to improve the quality of the score.

Fifth Embodiment

In each of the first to fourth embodiments, the display control unit 105 performs display on the display device 1007 with respect to all the processing target data and prompts the user to perform a selection operation. However, depending on a pair of representative data, the representative data may be very similar to each other and it may be difficult to visually determine which data is more preferable. When displaying such data, a choice (a choice concerning the quality of the representative data) prepared in case that the user hesitates to make determination, such as a choice of "both are satisfactory", may be prepared to make the user select it. However, since data that cannot be determined by a person are not important, displaying these data every time may annoy the user. Therefore, it is desirable not to display data for which a person hesitates to make determination, instead of displaying all the representative data obtained from the processing target data.

The fifth embodiment will describe an example of statistically deciding, using a relationship check result reflecting a user operation, a reference for a display control unit 105 to display representative data. Similar to the first and second embodiments, this embodiment assumes that an image including a person is processed and processing target data is an edge image having undergone edge extraction for the purpose of extracting the contour of the person. Assume also that contents of processing by a processing execution unit 103 are threshold processing and a parameter of interest is a threshold.

<Functional Arrangement of Information Processing Apparatus>

Figure 11:
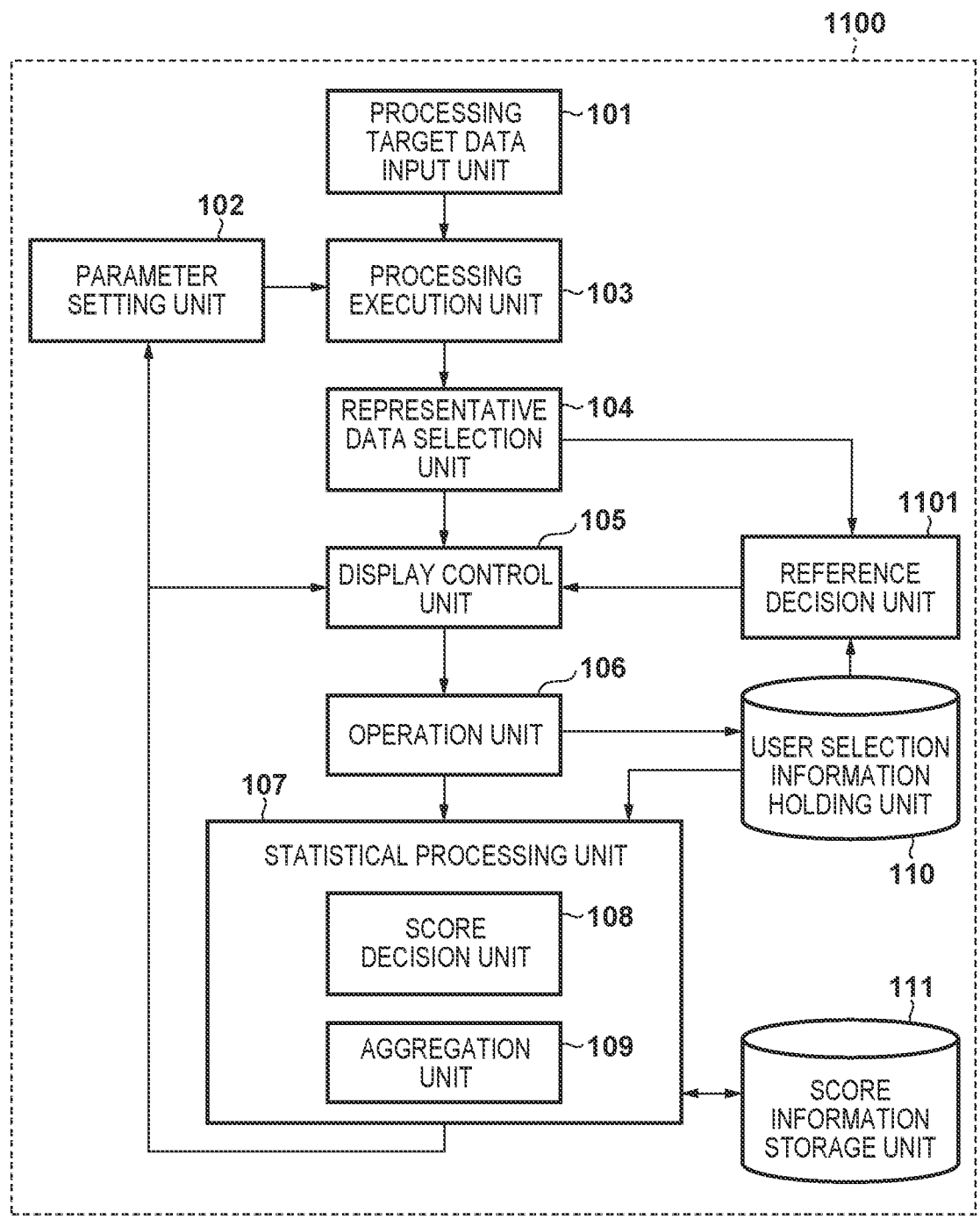
FIG. 11 is a block diagram showing the functional arrangement of an information processing apparatus according to still another embodiment.

FIG. 11 is a block diagram showing the functional arrangement of an information processing apparatus 1100 according to the fifth embodiment. In the third embodiment, a reference decision unit 1101 is added to the arrangement of the information processing apparatus 100 described with reference to FIGS. 1A and 1B in the first embodiment.

Using user selection information held in a user selection information holding unit 110, the reference decision unit 1101 decides the reference of data to be presented to the user. Based on the reference decided by the reference decision unit 1101, the display control unit 105 determines whether to display representative data on a display device 1007 after receiving the representative data, and displays, in accordance with a determination result, only the representative data to be displayed.

<Processing Contents of Each Constituent Element>

A timing when the reference decision unit 1101 decides the reference is before the series of processes shown in FIG. 2 in the first embodiment are performed. Display contents output by the display control unit 105 will be described with reference to an image 1210 in FIG. 12A. The image 1210 is an example of a display screen, and is used to describe a display method in a case of checking similarity as a relationship. Images 1215, 1216, 1217, 1218, and 1219 shown in the displayed image 1210 are processing execution results obtained by applying processing to given processing target data using different candidate values by the processing execution unit 103.

In dotted line regions 1211, 1212, and 1213, a result of grouping the processing execution results based on the relationship is displayed. It is indicated that the processing execution results 1215, 1216, and 1217 included in the dotted line region 1211 belong to a group g1 and the processing execution results 1218 and 1219 included in the dotted line region 1213 belong to a group g2. The dotted line region 1212 is a region prepared for a processing execution result that cannot be classified by grouping.

If the user observes the classification on the display screen and the classification is different from visual impression, he/she changes the group of the processing execution result using an operation unit 106. For example, if the user wants to change the group of the processing execution result 1217 from the group g1 to an unclassifiable group, he/she moves a mouse pointer 1214 to the processing execution result 1217 and drags it in the direction of an arrow 1215, thereby changing the group from the group g1 to the unclassifiable group.

If the user observes the classification on the display screen, and determines that all the processing execution results are similar to each other and there is no difference between them, the user can change the groups of all the processing execution results to the unclassifiable group by a similar drag operation. Alternatively, a choice indicating "unclassifiable" may be prepared on the display screen, and selected by the user.

Figures 12A, 12B, 12C:
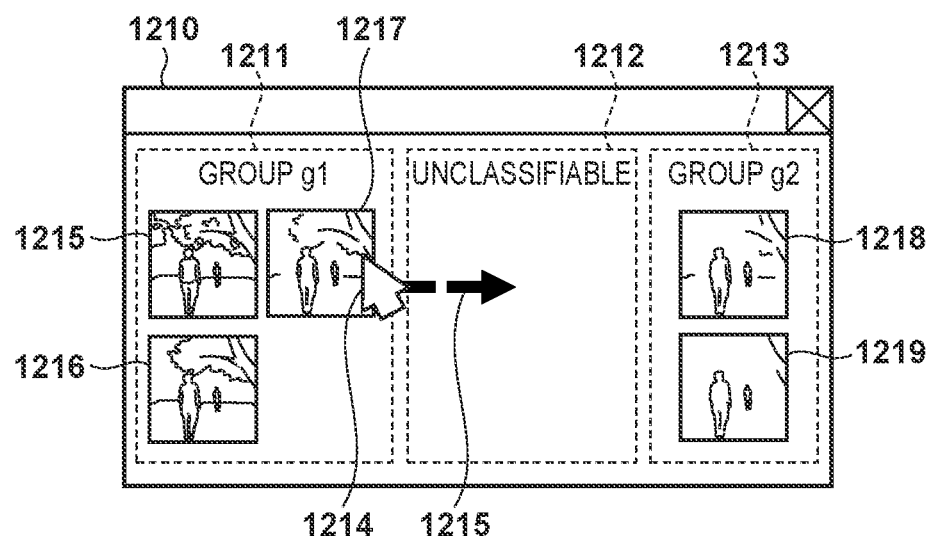
FIG. 12A is a view for explaining an example of processing using a reference decision unit.
FIG. 12B is a table for explaining the example of the processing using the reference decision unit.
FIG. 12C is a table for explaining the example of the processing using the reference decision unit.

FIG. 12B shows an example of the relationship reflecting a user operation. A table of FIG. 12B shows the classification of the processing execution results of the candidate values for each processing target data. In processing target data image1, belonging groups are stored for candidate values $\alpha 1$, $\alpha 2$, $\alpha 4$, and $\alpha 5$, and NULL is stored for the processing execution result of α3 instead of the group since the user changes the group to the unclassifiable group.

Next, the reference decision unit 1101 will be described. Based on the relationship check result, the representative data, and the user selection information, the reference decision unit 1101 statistically decides the reference of representative data to be displayed by the display control unit 105.

First, the reference decision unit 1101 checks the similarity using the result of visual observation of the user and the processing execution results confirmed to belong to different groups. The similarity is checked with reference to FIG. 12B that shows the relationship check result for each processing target data. If the processing execution results are grouped, each pair of processing execution results belonging to different groups is selected, and processing of calculating the distance between the processing execution results is repeatedly executed for all the pairs. Then, for each processing target data, the minimum value of the distance is recorded in a reference analysis table shown in FIG. 12C. The distance is obtained by calculating the sum of squared differences between pixels at corresponding positions in the two processing execution results. If only NULL is set for all the candidate values in the relationship check result, no distance is calculated and the process advances to the next processing target data. Since the pieces g1 and g2 of group information are stored with respect to the processing target data image1 in FIG. 12B, the distance between the processing execution results of different groups is calculated while changing the pair, and the minimum value of the distance is stored in the reference analysis table shown in FIG. 12C.

If the minimum value of the distance is repeatedly recorded while changing the processing target data, and a sufficient amount of data can be collected to decide the reference for performing display to the user, the reference is statistically decided. More specifically, only the information of the processing target data for which the distance has been obtained is extracted, and the average value of the distances is set as a reference.

Processing contents after the reference is decided are the same as those of the processing described with reference to FIG. 2. The display control unit 105 calculates the distance between representative data newly received from a representative data selection unit 104. Then, if the distance is compared with the reference value decided by the reference decision unit 1101, and is equal to or larger than the reference value, it is determined that there is a difference between the representative data for the user, and the representative data are thus displayed on the display screen. To the contrary, if the distance is smaller than the reference value, the representative data are not displayed.

As described above, when the reference decision unit 1101 decides the reference of representative data to be displayed, the representative data to be displayed can be limited, thereby making it possible to efficiently perform display and selection.

Note that in the above description, by displaying the image 1210 shown in FIG. 12A, information is collected in advance to decide the reference but information need not always be collected in advance. As described in each of the above embodiments, by repeating the processes of the representative data selection unit 104, the display control unit 105, and the operation unit 106 while changing the processing target data, the reference may be decided.

More specifically, in addition to the representative data, choices (choices concerning the quality of the representative data) prepared in case that the user hesitates to make determination, such as choices of "both are satisfactory", "both are unsatisfactory", and "determination is impossible", are displayed on the display screen. Then, by excluding a case in which one of the choices is selected, only if the representative data is selected, the distance between the representative data is calculated and stored in the reference analysis table. By obtaining the average value of the distances calculated for the processing target data for which display has ended, and setting the average value as a reference, it is possible to update the reference while repeating the display processing. This can further reduce the work of the user, as compared with a method of collecting information in advance to decide the reference.

According to the present invention, it is possible to decide an appropriate value of a parameter while reducing the load of the user in a status in which there exist a plurality of data to be processed using the parameter.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. An information processing apparatus comprising:
at least one processor; and
at least one memory storing executable instructions which, when executed by the processor, cause the information processing apparatus to perform operations including:
acquiring a plurality of images representing results of executing predetermined image processing for target data using a plurality of candidate values of a parameter associated with the predetermined image processing;

selecting a plurality of representative images from the plurality of images;

displaying the plurality of selected representative images on a display unit;

accepting an operation input to the plurality of displayed representative images;

deciding a score for each of the plurality of candidate values based on the information obtained by the operation and the plurality of images, and deciding at least one value from the plurality of candidate values based on an aggregation result of the scores, wherein if the scores have not been decided for all target data, information indicating a midway aggregation result is displayed on the display unit.

2. The information processing apparatus according to claim 1, wherein the score for each of the plurality of candidate values is decided based on a relationship between the information obtained by the operation and each of the results of the predetermined image processing using the plurality of candidate values.

3. The information processing apparatus according to claim 2, wherein a degree of similarity between the representative image for which the operation is accepted and each of the plurality of images representing the results of the predetermined image processing using the plurality of candidate values is calculated, and the score is decided based on the degree of similarity.

4. The information processing apparatus according to claim 2, wherein
the relationship by grouping the plurality of images is acquired based on a data distribution of the results of the predetermined image processing using the plurality of candidate values, and
the score is decided based on whether each image belongs to the same group as a group to which the representative image selected by the operation belongs.

5. The information processing apparatus according to claim 1, wherein the scores is aggregated by generating a histogram for each of the candidate values.

6. The information processing apparatus according to claim 1, wherein executing the executable instructions causes the information processing apparatus to perform further operations including
changing the candidate values based on a midway aggregation result aggregated when the scores have not been decided for all the target data.

7. The information processing apparatus according to claim 1, wherein if the representative image corresponding to the candidate value whose score is not higher than a predetermined value is selected by the operation in a midway aggregation result aggregated when the scores have not been decided for all the target data, the plurality of representative images is redisplayed on the display unit.

8. The information processing apparatus according to claim 1, wherein at least one of the candidate value, the information concerning the scores, and a coverage ratio representing a ratio of the number of target data for which the score not lower than the predetermined value is decided based on the value decided with respect to the total number of target data are displayed on the display unit.

9. The information processing apparatus according to claim 1, wherein if each target data is data of a small region forming one image, a coverage range, in the image, of the target data for which the score not lower than the predetermined value is decided based on the candidate value are displayed on the display unit.

10. The information processing apparatus according to claim 2, wherein
choices concerning quality of the representative images together with the plurality of representative images are displayed on the display unit, and
the score is decided based on a selection result of the choices and the relationship.

11. The information processing apparatus according to claim 2, wherein executing the executable instructions causes the information processing apparatus to perform further operations including
acquiring an information analysis result based on the information obtained by the operation for each target data,
wherein the score is decided based on the information analysis result and the relationship.

12. The information processing apparatus according to claim 11, wherein the information analysis result is acquired based on information of a time from when the plurality of representative images are displayed until a user performs the operation.

13. The information processing apparatus according to claim 11, wherein user selection information obtained for each target data is analyzed, and, as the information analysis result, information concerning an order of the plurality of candidate values is acquired.

14. The information processing apparatus according to claim 11, wherein, as the information analysis result, information concerning reliability of each target data based on a skill level of each user determined based on a result of the operation by at least one user is acquired.

15. A control method for an information processing apparatus, comprising:
acquiring a plurality of images representing results of executing predetermined image processing for target data using a plurality of candidate values of a parameter associated with the predetermined image processing;
selecting a plurality of representative images from the plurality of images;
displaying the plurality of selected representative images on a display unit;
accepting an operation input to the plurality of displayed representative images;
deciding a score for each of the plurality of candidate values based on the information obtained by the operation and the plurality of images, and
deciding at least one value from the plurality of candidate values based on an aggregation result of the scores,
wherein if the scores have not been decided for all target data, information indicating a midway aggregation result is displayed on the display unit.

16. A non-transitory computer-readable storage medium storing a program for causing a computer to execute a control method for an information processing apparatus, comprising:
acquiring a plurality of images representing results of executing predetermined image processing for target data using a plurality of candidate values of a parameter associated with the predetermined image processing;
selecting a plurality of representative images from the plurality of images;
displaying the plurality of selected representative images on a display unit;
accepting an operation input to the plurality of displayed representative images;

deciding a score for each of the plurality of candidate values based on the information obtained by the operation and the plurality of images, and deciding at least one value from the plurality of candidate values based on an aggregation result of the scores, wherein if the scores have not been decided for all target data, information indicating a midway aggregation result is displayed on the display unit.

17. An information processing apparatus comprising:

at least one processor; and at least one memory storing executable instructions which, when executed by the processor, cause the information processing apparatus to perform operations including:

acquiring a plurality of images representing results of executing predetermined image processing for target data using a plurality of candidate values of a parameter associated with the predetermined image processing;

selecting a plurality of representative images from the plurality of images;

displaying the plurality of selected representative images on a display unit;

accepting an operation input to the plurality of displayed representative images;

deciding a score for each of the plurality of candidate values based on the information obtained by the operation and the plurality of images, and deciding at least one value from the plurality of candidate values based on an aggregation result of the scores, wherein at least one of the candidate value, the information concerning the scores, and a coverage ratio representing a ratio of the number of target data for which the score not lower than the predetermined value is decided based on the value decided with respect to the total number of target data are displayed on the display unit.

18. A control method for an information processing apparatus, comprising:

acquiring a plurality of images representing results of executing predetermined image processing for target data using a plurality of candidate values of a parameter associated with the predetermined image processing;

selecting a plurality of representative images from the plurality of images;

displaying the plurality of selected representative images on a display unit;

accepting an operation input to the plurality of displayed representative images;

deciding a score for each of the plurality of candidate values based on the information obtained by the operation and the plurality of images, and deciding at least one value from the plurality of candidate values based on an aggregation result of the scores, wherein at least one of the candidate value, the information concerning the scores, and a coverage ratio representing a ratio of the number of target data for which the score not lower than the predetermined value is decided based on the value decided with respect to the total number of target data are displayed on the display unit.

19. A non-transitory computer-readable storage medium storing a program for causing a computer to execute a control method for an information processing apparatus, comprising:

acquiring a plurality of images representing results of executing predetermined image processing for target data using a plurality of candidate values of a parameter associated with the predetermined image processing;

selecting a plurality of representative images from the plurality of images;

displaying the plurality of selected representative images on a display unit;

accepting an operation input to the plurality of displayed representative images;

deciding a score for each of the plurality of candidate values based on the information obtained by the operation and the plurality of images, and deciding at least one value from the plurality of candidate values based on an aggregation result of the scores, wherein at least one of the candidate value, the information concerning the scores, and a coverage ratio representing a ratio of the number of target data for which the score not lower than the predetermined value is decided based on the value decided with respect to the total number of target data are displayed on the display unit.

\* \* \* \* \*